United States Patent
Scola et al.

(10) Patent No.: US 6,911,519 B2
(45) Date of Patent: Jun. 28, 2005

(54) LOW VISCOSITY MELT PROCESSABLE HIGH TEMPERATURE POLYIMIDES

(75) Inventors: Daniel A. Scola, Glastonbury, CT (US); Christopher D. Simone, Pickerington, OH (US)

(73) Assignee: University of Connecticut, Farmington, CT (US)

(*) Notice: Subject to any disclaimer, the term of this patent is extended or adjusted under 35 U.S.C. 154(b) by 109 days.

(21) Appl. No.: 10/396,308

(22) Filed: Mar. 25, 2003

(65) Prior Publication Data

US 2004/0006196 A1 Jan. 8, 2004

Related U.S. Application Data

(60) Provisional application No. 60/367,892, filed on Mar. 26, 2002.

(51) Int. Cl.[7] .................. C08G 73/10; C08G 69/28; C08G 69/26; C08L 77/00
(52) U.S. Cl. .................. 528/170; 528/125; 528/126; 528/128; 528/172; 528/173; 528/179; 528/183; 528/186; 528/188; 528/220; 528/229; 528/310; 528/322; 528/350; 528/351; 528/353; 528/502 R; 526/262; 526/285; 525/420; 525/432; 525/436
(58) Field of Search .................. 528/353

(56) References Cited

U.S. PATENT DOCUMENTS

| | | |
|---|---|---|
| 4,350,655 A | 9/1982 | Hoge |
| 4,472,328 A | 9/1984 | Sugimoto et al. |
| 4,705,812 A | 11/1987 | Ito et al. |
| 4,705,813 A | 11/1987 | Ito et al. |
| 4,777,073 A | 10/1988 | Sheth |
| 4,803,231 A | 2/1989 | Seinera et al. |
| 4,814,124 A | 3/1989 | Aoyama et al. |
| 4,829,096 A | 5/1989 | Kitamura et al. |
| 4,889,879 A | 12/1989 | Seinera et al. |
| 4,921,652 A | 5/1990 | Tsuji et al. |
| 4,921,653 A | 5/1990 | Aoyama et al. |
| 4,925,915 A * | 5/1990 | Mueller et al. ............. 528/353 |
| 4,929,303 A | 5/1990 | Sheth |
| 5,055,338 A | 10/1991 | Sheth et al. |
| 5,412,066 A * | 5/1995 | Hergenrother et al. ...... 528/353 |

FOREIGN PATENT DOCUMENTS

| CA | 1175226 | 10/1984 |
|---|---|---|

OTHER PUBLICATIONS

Macromolecules 2000, 33(23) pp. 8611–8617, Michael E. Wright et al "Thermally Curing Aryl–Ethynyl End–Capped Imide Oligomers: Study of New Aromatic End Caps.".*
Macromolecules 2000, 33(5) pp. 1671–1681, Xi. Fang et al "A Solid–State 13C NMR Study of the Cure of 13C–Labeled Phenylethynyl End–capped Polyimides".*
Macromolecules 2003 36(18), pp. 6780–6790, C.D. Simone et al "Phenylethynl Endcapped Polyimides . . . and 3,3',4, 4'–Biphenylene Dianhydride Structure–Viscosity Relationship.".*
Macromolecules 2002, 35(15), pp. 5835–5839, Craig M. Thompson et al "Aryl Ethynyl Terminated Imide Oligomers and Their Cured Polymers".*
*Chemistry and Properties of a Phenylethnyl–Terminated Polyimide*, Robert G. Bryant et al.J. Applied Polymer Sci. vol. 59, Wiley, NY (1996), pp. 1249–1254.
*Polyimides with Pendent Ethynyl Groups*, B. J. Jensen et al., Polymer, vol. 34, No. 3, (1993) pp. 630–635.
*Chemistry and Properties of Phenylethynyl Phthalic Anhydride Imde Oligomers*, J. G. Smith Jr. et al., AES Polymer Preprints, (Mar. 1994) pp. 353–354.
*Phenylethynl–Terminated Imide Oligomers and Polymers Therefrom*, P. M. Hergenrother et al. J. Polymer Sci. vol. 32, Wiley, NY (1994), pp. 3061–3067.
*Chemistry and Properties of Imide Oligomers end–capped with Phenylethynylphthalic Anhydrides*, P. M. Hergenrother, et al., Oiktn, Oreor, 35 *1(1994), pp. 4857–4864.
*Synthesis and Characterization of Modified Phenylethynyl Imides*, B. J. Jensen et al., High Perform. Polym. 10 (1998) 175–180.
*Molecular Strcture Effects on the Secondary Relaxation and impact Strength of a Series of Polyester Copolymer Glasses*, L.P. Chen et al., Macromolecules, 31 (16) (1998) pp. 5371–5382.
*Synthesis and Thermooxidative Stability of Poly[1,4–phenylene–4,4'–(2,2, 2–trifluoro–1–phenylethylidene)bisphthalimide] and Other Fluorinated Polymides*, D. A. Scola, J. Polym. Sci. Part A: Polym Chem., 31, 1996–2008 (1993).
*Imide Oligomers Containing Pendent and Terminal Phenylethynyl Groups*, J. G. Smith et al., Polymer Vo. 38, No. 18 (1997) pp. 4657–4665.
*IM7/LARC MPE–1 Polyimide Composites*, T. H. Hou et al., High Perf. Polymers 10 (2), (1998) Abstract.
*The Effect of Phenylethynyl Terminated Imide Oligomer Molecular Weight on the Properties of Composites*, J. G. Smith et al., Journal of Composite Materials 34(7), (2000) Abstract.

* cited by examiner

Primary Examiner—P. Hampton Hightower
(74) Attorney, Agent, or Firm—McCarter & English, LLP

(57) ABSTRACT

A series of low melting and low viscosity phenylethynyl end-capped polyimides (PETIs) possessed of long term thermal and mechanical stability useful as films, melt coatings, adhesives, matrix and RTM resins and particular as coatings for optical fibers and phenylethynyl end-capped bismides blended with PETIs are disclosed. Processes for their production including: 1) modification of PETI-5 oligomer by molecular weight adjustments by blending with reactive low melting phenylethynyl end-capped imide monomers, 2) modification of the PETI-5 backbone structure with other diamine components, and 3) modification of the PETI-5 backbone with bulky fluorinated groups are also disclosed.

26 Claims, 11 Drawing Sheets

Cracklines created by beading on fiber coated with PETI-BDAF

310°C Isothermal Viscosity of PETI Oligomers

Thermal stability of 3F oligomers

Schematic of optical fiber coater and cure oven

3FDA-PETI-5 Coated and cured fiber drawn into ¾" loop without damage to fiber or coating 3FDA-BDAF 5000 coated and cured fiber PETI 2 (70%) / PEPA-BDAF (30%) Blend coated and cured fiber 3FDA-PETI-5 Coated fiber 3FDA-APB 5000 coated and cured fiber. Example of beading phenomena observed.

Figure 18: FT-IR spectrum of PETI-2000

DSC thermal analysis of PETI-2000

FT-IR spectrum of 3FDA-BDAF 5K

DSC thermal analysis of 3FDA-BDAF 5K

FT-IR spectrum of PETI-BDAF 3000

DSC thermal analysis of PETI-BDAF 3000

FT-IR spectrum of MPEI-6

DSC thermal analysis of MPEI-6

FT-IR spectrum of a tetra-phenylethynyl terminated imide oligomer 3000MW

DSC thermal analysis of a tetra-phenylethynyl terminated imide oligomer 3000MW

FT-IR spectrum of PEPA-BDAF bisimide

DSC thermal analysis of PEPA-BDAF bisimide

LOW VISCOSITY MELT PROCESSABLE HIGH TEMPERATURE POLYIMIDES

CROSS-REFERENCE TO RELATED APPLICATION

This application claims priority from provisional application Ser. No. 60/367,892 filed Mar. 26, 2002 which application is incorporated herein by reference.

Generally the present invention relates to novel melt processable low viscosity, high temperature polyimides and more particularly to low viscosity phenylethynyl end-capped polyimide oligomers. The polyimides of the invention have multiple uses including as films, melt coatings, adhesives, matrix and RTM resins. A preferred application is the protection of optical fibers such as are used in the oil industry in connection with high performance sensor systems used in deep, hot oil wells and ruggedized optical fiber cable.

BACKGROUND OF THE INVENTION

The current polymide materials do not have acceptable low melt viscosities and the high temperature, long term, thermal and mechanical stabilities required to permit them to function for their intended applications including as films, melt coatings, for example high temperature buffer coatings for optical fibers and junction splice applications. There is a need in the industry for polymide resins that have the desired properties.

OBJECT AND SUMMARY OF THE INVENTION

It is an object of the invention to provide a series of low molecular weight phenylethynyl (PE) end-capped imide oligomers (PETIs) possessed of the long term thermal and mechanical stability required for use in their intended applications.

It is a further object of the invention to provide such low viscosity phenylethynyl end-capped polyimides using different approaches including by 1) modification of a state-of-the-art PETI-5 oligomer by molecular weight adjustments by blending with reactive low melting phenylethynyl end-capped imide monomers 2) modification of the PETI-5 backbone structure with other diamine components 3) modification of the PETI-5 backbone with bulky fluorinated groups The different approaches used to obtain the desired low viscosity phenylethynyl polyimides are hereinafter described.

DETAILED DESCRIPTION OF THE INVENTION

Figure 1:
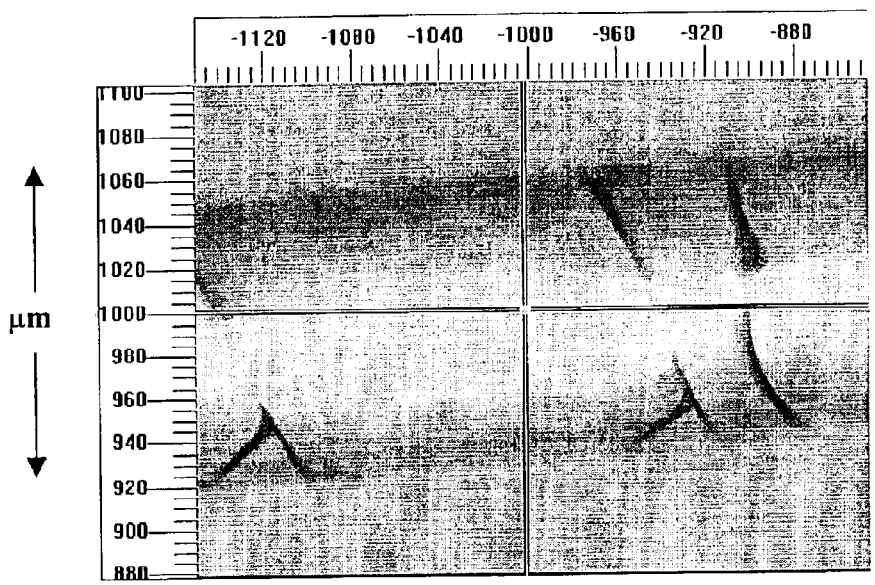
FIG. 1 shows the crack lines created by beading on fiber coated with PETI-BDAF.

The present invention is directed to low viscosity, high temperature polyimide resins having improved properties including long term thermal and mechanical stabilities. The invention includes methods of making both high temperature and low viscosity polyimides and fluorinated polyimides and the resulting polyimide.

It has already been proposed that by lowering the molecular weight of PETI oligomers more acceptable viscosities could be achieved in the desired temperature range (290° C.–315° C.).

A series of low molecular weight PETI oligomers (2,000 and 3,000 MW) were synthesized, which incorporated the same ratio of amines present in PETI-5 (15% APB, 85% ODA), but the stoichiometry was altered so that the theoretical molecular weight was decreased to 2,000 and 3,000, respectively.

Low Molecular Weight PETI Oligomers

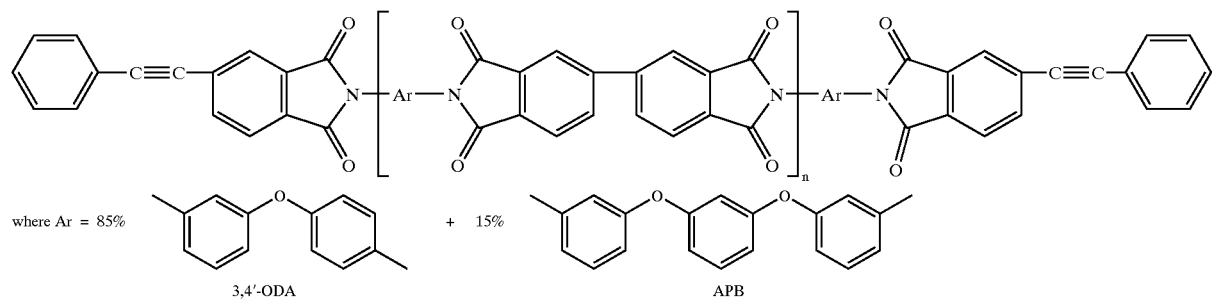

3,4'-ODA            APB (wherein ODA represents diaminodiphenylether and APB represents 1,3-bis(3-aminophenyl)-benzene.)

PETI-5 Structure

These PETI 2000 and PETI 3000 oligomers were synthesized using the conventional imide synthesis method with N-methyl-2-pyrrolidinone (hereinafter NMP) as solvent and thermally imidizing the polyamic acid by removing water as an azeotrope with toluene. Both species were recovered in high yields (>96%).

These materials exhibited high melt viscosities and very short melt stability at 310° C., and therefore did not result in coherent coatings on the optical fiber. The thermal analysis data for both oligomers showing $T_g$'s before and after cure are shown in Table 1.

TABLE 1

Thermal Properties of PETI Imide Oligomers

|  | Prior to Cure | | After Cure |
|---|---|---|---|
|  | $T_g$(° C.) | $T_m$(° C.) | $T_g$(° C.) |
| PETI 2000 | 187.8 | 320.0 | 282.2 |
| PETI 3000 | 194.4 | 318.6 | 262.4 |

PETI/Reactive Blends

An attempt was made to reduce the viscosities of the PETI oligomers by blending with reactive low melting phenylethynyl end-capped imide monomers. A series of PETI oligomers of different molecular weights (2000, 3000 and 5000) were blended with several reactive phenylethynyl end-capped bisimide diluents. (PETI/reactive blends.) The reactive end-capped monomers were synthesized from 4-phenylethynylphthalic anhydride (PEPA) and various diamines. The materials which were evaluated and their melting points, are listed in Table 2. A blend of PETI/reactive diluent at a 70:30 weight ratio was used.

TABLE 2

Phenylethynyl End-capped Reactive Diluents

| Material | Melting Point (° C.) |
|---|---|
| 3,4'-Bis[4-(phenylethynyl)phthalimido]diphenylether(PEPA-3,4'-ODA) | 297 |
| N,N'-[2,2-(4-phenoxyphenyl)hexafluoroisopropylidene]bis-(4-phenylethylylphthalimide)(PEPA-4-BDAF) | 260 |

TABLE 2-continued

Phenylethynyl End-capped Reactive Diluents

| Material | Melting Point (° C.) |
|---|---|
| N,N'-(4,4'-dipheylnetehylene)bis(4-phenylethynylphthalimide)(PEPA-4,4'MDA) | 285 |
| N,N'-(1,4-phenylene)bis(4-phenylethynylphthalimide(PEPA-p-PDA) | 296 |
| N,N'-(1,3-phenylene)bis(4-phenylethynylphthalimide(PEPA-m-PDA) | 248 |
| N-[4-(3-phenoxy)-4'-phenylethynylbenzophenone]4'-phenylethynylphthalimide(PEPA-APDE) | 167 |

The blends were prepared by mixing 1 gram of each powder mixture in a crucible by physical means prior to heating in a temperature controlled furnace set at the appropriate melting temperature of the reactive monomer to obtain the melt. The resulting melt was then cooled and ground to a fine powder.

Each of the above blends was then evaluated using the dip coating method. Strips of fiber optic cable (16 inch sections) were cut. A two inch section of each fiber was stripped of its original polyimide coating by forming a small loop and dipping it into fuming sulfuric acid and agitating until coating dissolution had taken place, followed by rinsing in methanol. A fiber recoating station was constructed by using a standard laboratory hotplate, glass slides, and a digital thermocouple. The digital thermocouple was placed in contact with the surface of the hot plate to provide an adequate measure of the surface temperature of the hot plate. The resin powder was placed on a glass slide on the hot plate, excess resin was removed by contacting the clean area of the glass slide. Table 3 below summarizes the results obtained when coating fibers with the reactive diluent blends.

TABLE 3

Buffer Coating Evaluations on Optical Fibers

| Sample | Resin | Reactive Monomer | Coating Temperature | Observations |
|---|---|---|---|---|
| 1 | PETI 2 | PEPA-p-PDA | 340°–350° C. | Beads on Fiber |
| 2 | PETI 2 | PEPA-APPE | 300°–310° C. | Beads on Fiber |
| 3 | PET12 | PEPA-4,4'-MDA | 295°–305° C. | Beads on Fiber |
| 4 | PET12 | PEPA-4-BDAF | 305°–315° C. | No Beads on Fiber |

TABLE 3-continued

Buffer Coating Evaluations on Optical Fibers

| Sample | Resin | Reactive Monomer | Coating Temperature | Observations |
|---|---|---|---|---|
| 5 | PET12 | PEPA-3,4-ODA | 305°–315° C. | Beads on Fiber |
| 6 | PET13 | PEPA-3,4-ODA | 305°–315° C. | Beads on Fiber |
| 7 | PETI 5 | PEPA-3,4-ODA | 345°–350° C. | Beads on Fiber |
| 8 | PETI 5 (100%) | — | 345°–350° C. | Too viscous for use as coating alone |

Evaluation of the fiber coatings was made after removing the coated fiber from the resin droplet and cooling in air approximately 10 seconds.

Preliminary evaluation of these blends showed that with the exception of the PEPA-4-BDAF blend, all of the blends formed beads on the fiber. Moreover, the PEPA-4-BDAF coated optical fiber was able to form a 1" loop without failure of the coating by the formation of cracks or crazes.

Cure of the coated fibers at above 300° C. immediately after coating produced coherent thin, smooth coatings for all compositions.

It has previously been proposed to modify the PETI-5 chain morphology with multi-functional amines. However, the proposed procedure resulted in phenylethynyl end-capped imide oligomer structures that were not satisfactory for their intended applications.

Architectural Alteration of PETI Imide Oligomers

1) MPEI-6 (Trifunctional Modification)

The incorporation of a triamine and specifically of triamine (2,4,6-triaminopyrimidine) as a means to lower viscosity of PETI imide oligomers was carried out as it had been theorized that by using a small amount of a triamine, a random distribution of linear, star and branched oligomers would result which would increase the free-volume of the resin leading to improved properties.

The following illustrates the synthesis which was utilized. The theoretical Mn is 5500 and the stoichiometry is such so that there is theoretically one triamine per molecule providing a maximum functionality of three along with a random distribution of star, linear and branched structures.

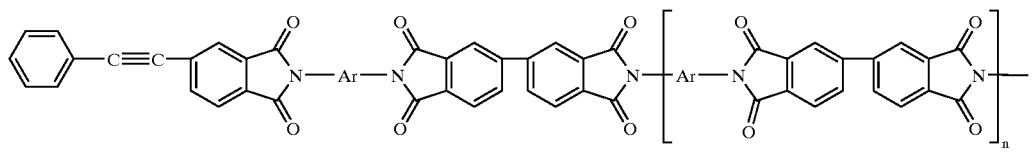

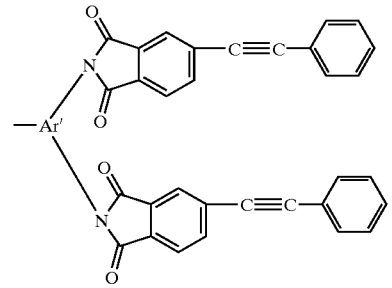

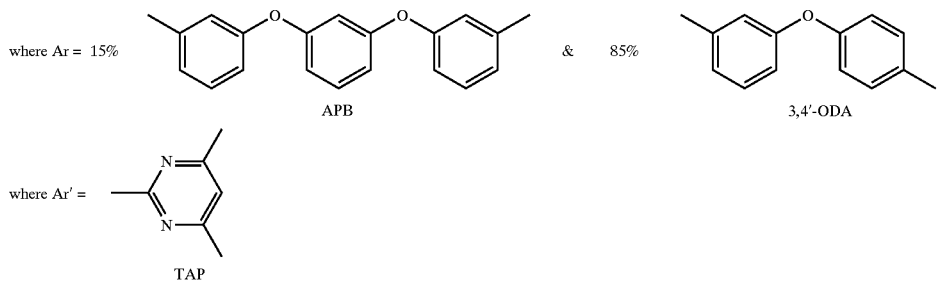

Phenylethynyl End-capped Trifuctional Imide Oligomer Structure wherein TPA is 2,4,6-triaminopyramidine.

The reagent addition was conducted so as to provide a random distribution of oligomers. The BPDA and PEPA were added as a slurry to a NMP solution of the appropriate diamines and triamines. Thermal analyses gave the following results:

| | |
|---|---|
| $T_g$ prior to cure: | 213.2° C.; |
| Exotherm onset: | 407° C.; |
| Exotherm peak: | 439.8° C.; |
| $T_g$ after cure: | 256.6° C. |

Incorporation of the triamine resulted in a completely amorphous oligomer with no crystalline melting transition detected by differential scanning calorimetry (DSC). Visual inspection on the recoating apparatus indicated the presence of a softening. On initial inspection, it appeared that the viscosity of the phenylethynyl end-capped trifunctional imide oligomer at elevated temperature (300–330° C.) was still too high for dip-coating applications.

2) Tetra-Phenylethynyl Terminated Modification

In a further attempt to alter the architecture of PETI imide oligomers it has been proposed to use 2,4,6-triaminopyrimidine (TAP) so as to alter linear PETI in such a way as to incorporate the triamine into the molecule leading to a tetrafunctional PEPA end-capped oligomer containing side chains of PEPA within the backbone (tetraphenylethynyl terminated imide modification). A mixture of linear, branched and star shaped molecules as shown immediately below was obtained.

Phenylethynyl End-capped Tetrafunctional Imide Oligomer Structure

The synthesis was conducted similar to that for PETI-5. However, the addition of TAP was made last to allow for maximum reactivity of the diamines and provide for molecular weight build-up prior to reaction with the triamine. PEPA was finally added 1 hour after the TAP addition. The material was stirred at room temperature for 24 hours followed by a Dean Stark distillation at reflux with toluene for 7 hours. The cooled reaction mixture was precipitated in a high speed blender with water, and then filtered and washed. The light beige powder was then dried in vacuo at 130° C. overnight yielding 4.462 g (89.3%) of an amorphous oligomer since no melt peak was observed in the DSC scan. Thermal analysis gave the following results:

| | |
|---|---|
| Uncured $T_g$ | 208.4° C.; |
| Exothermic Reaction Peak | 432.0° C.; |
| Cured $T_g$ | 339.4° C. |

The phenylethynyl end-capped tetra functional imide oligomer as synthesized were not suitable for melt coat applications.

3) Cyclohexane Modified PE Random Trifunctional Imide Oligomer MW=5000

It has been found that the presence of a 1,4-cyclohexylidene group in a polymer chain can reduce the

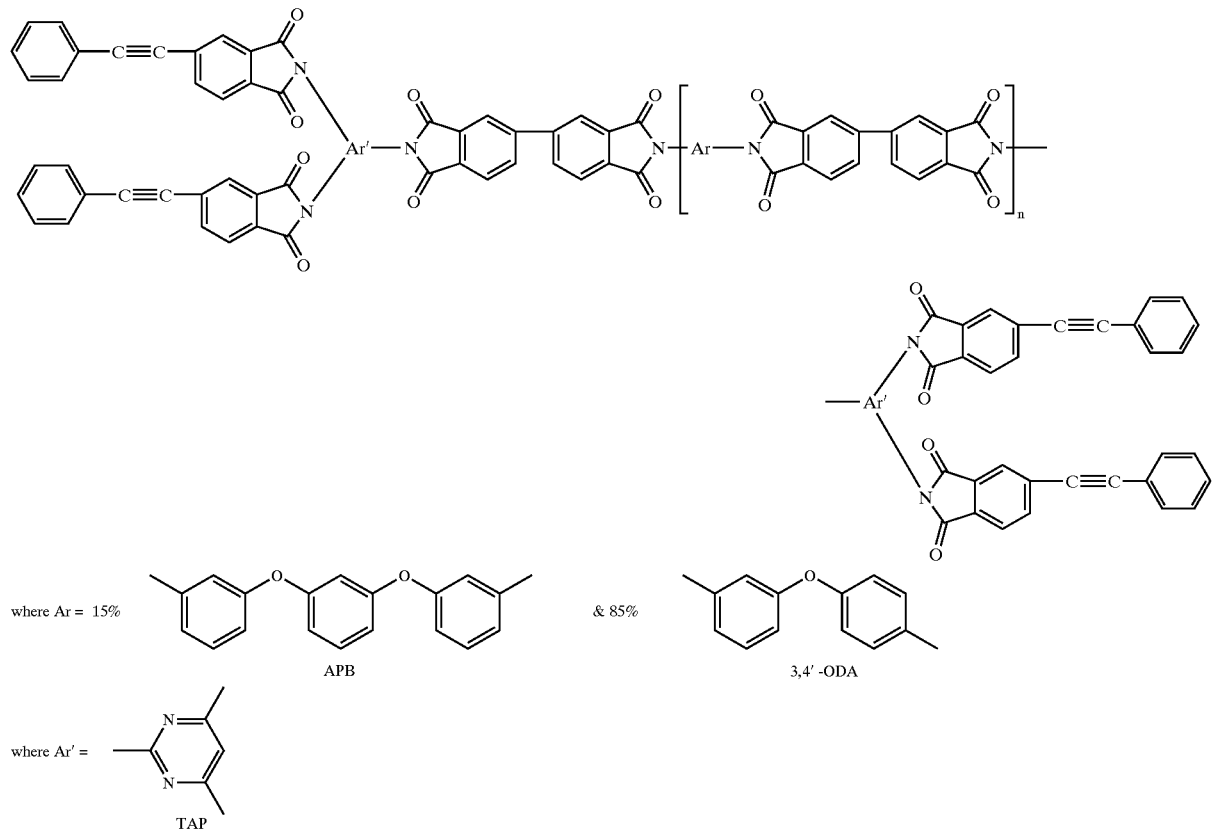

viscosity of the polymer by increased rocking motion due to the cis-trans transitions. Based thereon, 10% cyclohexyl group, i.e., 4-cyclohexanediamine was incorporated into a PETI-system. A stoichiometric amount of TAP was added to provide a random PETI containing a mixture of linear, branched and star molecules with a maximum theoretical functionality of three. Randomness was achieved by control of reagent addition during the synthesis. The cyclohexane modified phenylethynyl end-capped random trifunctional imide oligomer structure follows:

| Uncured $T_g$ | 229.6° C.; |
| Exothermic Reaction Peak | 418.0° C.; |
| Cured $T_g$ | 272.9° C. |

4) Cyclohexane Modification of PETI-5 Linear Oligomer 5000MW

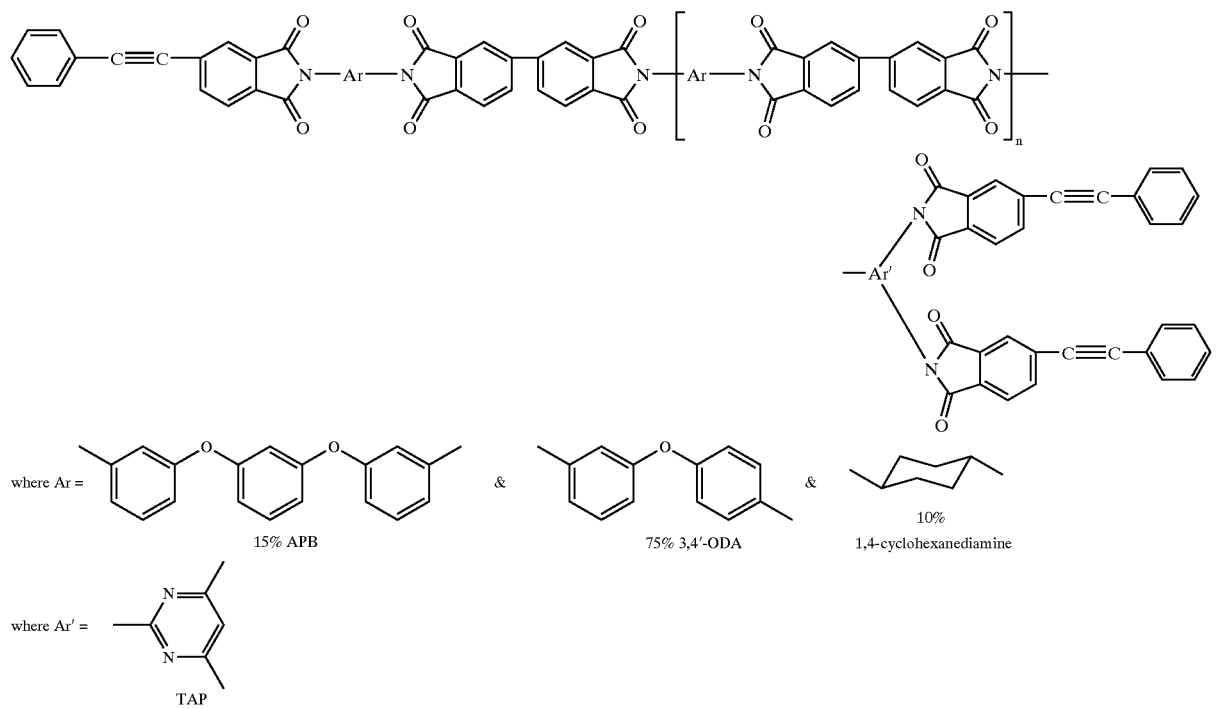

Cyclohexane Modified Phenylethynyl End-capped Random Trifunctional Imide Oligomer Structure DSC analysis was conducted on the dried material by first heating through the reaction exotherm (300° C. to 485° C.) and then cooling to room temperature. No crystalline melt was observed. The cured $T_g$ was then determined by re-heating the cured sample on the second scan. The results are shown below:

The inventors herein concluded that the synthesis as described above would result in particularly effective polyimides if as the starting oligomer a PETI linear oligomer having a molecular weight of 5000 were utilized.

Using the same procedure as with the trifunctional imide oligomer described above, 1,4-cyclohexanediamine was incorporated into PETI-5 in order to reduce its melt viscosity.

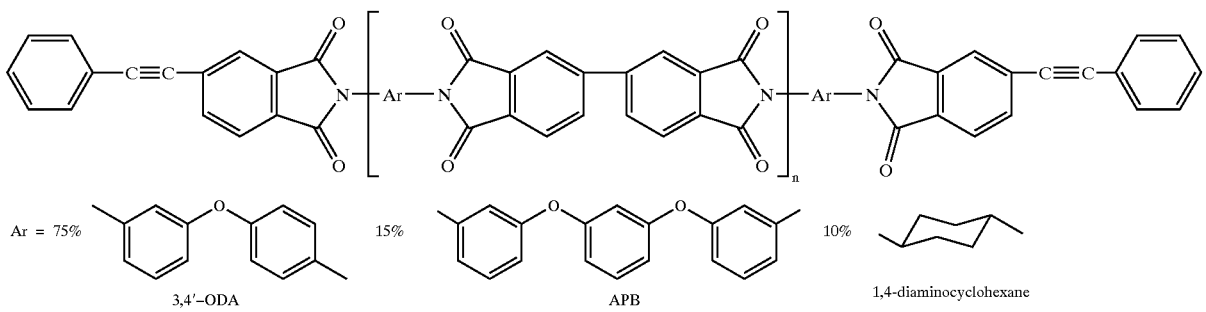

Cyclohexane Modification of PETI-5 Linear Oligomer 5000MW

The synthesis was conducted in the usual manner for linear PETI'S. The amines were added to the reaction vessel with NMP and stirred until completely dissolved. Then, BPDA was added as a slurry with NMP. PEPA was added last to complete the end-cap. The reaction mixture was stirred at room temperature for 24 hours and then refluxed for 18 hours with toluene using a Dean Stark trap to collect evolved water. The cooled reaction mixture was precipitated in a high speed blender with water and then filtered and washed. The yellow powder recovered was then dried in vacuo at 150° C. overnight yielding 6.717 g (89.5%).

DSC analysis was conducted on the dried material by first heating through the reaction exotherm (300° C. to 485° C.) and then cooling to room temperature. The cured $T_g$ was then determined by re-heating the cured sample on the second scan. This material exhibited a melt at 336° C., whereas the trifunctional imide oligomer, described above did not exhibit any melt.

| | |
|---|---|
| Uncured $T_g$ | 209.0° C. |
| Melting Temp. Peak | 335.7° C. |
| Exothermic rxn. Peak | 422.0° C. |
| Cured $T_g$ | 264.9° C. |

The complex melt viscosities of these PETI architectural modifications were determined to assess these molecular structural changes on this important process property. These results are listed in Table 4, along with the uncured and cured glass transition temperatures.

TABLE 6

Thermal transitions and Rheological data for PETI oligomers

| ID | STRUCTURE | Thermal Transition Temperature (° C.) UNCURED $T_g$ | $T_m$ | CURED $T_g$ | Rheological Data $\eta^*$ @ 300° C. (Poise) |
|---|---|---|---|---|---|
| A (control) PETI-5 | | 235 | 387 | 250 | 10,000 @ 371° C. |
| B Reactive Blend Approach PETI-2/PEPA-BDAF | 70% (w/w) 2000 MW Oligomer 30% (w/w) | 159.8 | 273.0 | 298.2 | 2,260 |
| MPEI-6 Linear, Star, Branched Oligomer Mix (5000 MW) | | 213.2 | ND | 256.6 | 773 |

TABLE 6-continued
Thermal transitions and Rheological data for PETI oligomers
| ID | STRUCTURE | Thermal Transition Temperature (° C.) | | | Rheological Data |
|---|---|---|---|---|---|
| | | UNCURED $T_g$ | CURED $T_m$ | $T_g$ | $\eta^*$ @ 300° C. (Poise) |
| D Cyclohexane Modified Branched Oligomer Linear, Star, Branched Mix (5000 MW) | 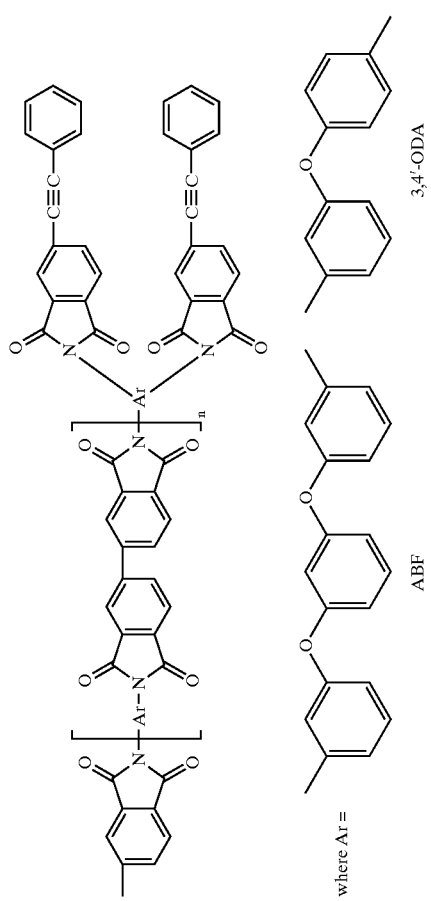 | 229.6 | ND | 272.9 | 2,100 |

TABLE 6-continued
Thermal transitions and Rheological data for PETI oligomers
| ID | STRUCTURE | Thermal Transition Temperature (° C.) | | | Rheological Data |
| | | UNCURED | | CURED | η* @ 300° C. |
| | | $T_g$ | $T_m$ | $T_g$ | (Poise) |
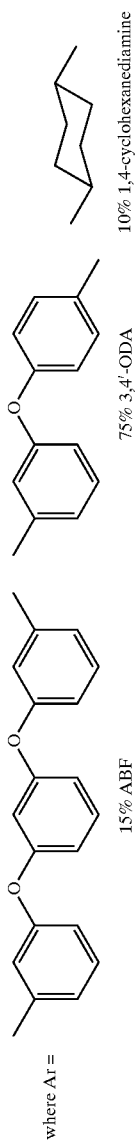
Thoeretical Structure
(Contains a mixture of linear, branched, and star-shaped molecules)
where Ar =   15% ABF   75% 3,4'-ODA   10% 1,4-cyclohexanediamine
where Ar¹ = 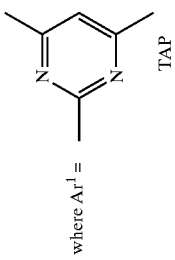   TAP TABLE 6-continued
Thermal transitions and Rheological data for PETI oligomers
| ID | STRUCTURE | Thermal Transition Temperature (° C.) | | | Rheological Data |
|---|---|---|---|---|---|
| | | UNCURED | | CURED | $\eta^*$ @ 300° C. |
| | | $T_g$ | $T_m$ | $T_g$ | (Poise) |
| E Cyclohexane Modified Linear Oligomer (5000 MW) | 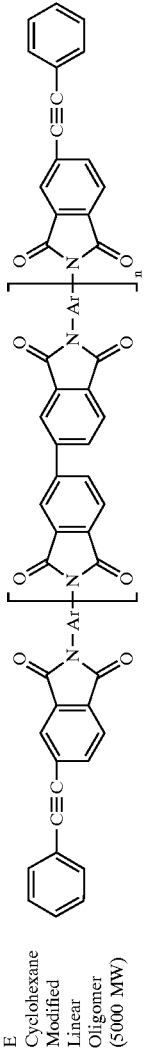 where Ar = 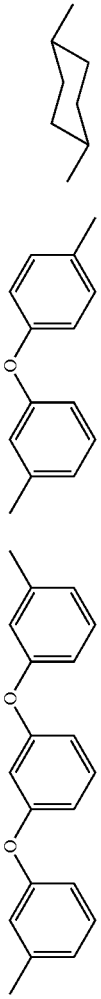 15% ABF 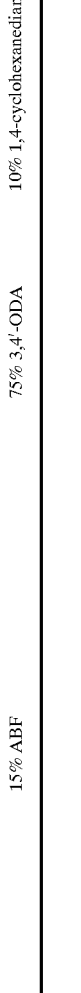 75% 3,4'-ODA  10% 1,4-cyclohexanediamine | 209.0 | 335.7 | 264.9 | 63,900 |

A comparison with PETI-5 establishes that in each case considerable improvement in the melt viscosity was obtained. However, the most improved system (MPEI-6), the trifunctional modification, the linear, star and branched oligomer, experienced a decrease in the $T_g$ to 257° C., below the accepted value of 275° C. Moreover, a complex viscosity of 773 poise is still too high for a melt coat operation. The cyclohexane modified molecular changes and the PETI-2/PEPA-BDAF blend system also showed a decrease in viscosity relative to PETI-5, but this was also too high for a melt coat application.

It is known that the molecular weight of the imide oligomer has an effect on its coatability. It has been proposed that PETI-5 be modified by replacement of the aforenoted diamines with 4-BDAF, a fluorine containing diamine-2,2'-bis[4-(4-amino-phenoxy) phenyl] hexafluoroisopropylidene.

5) PETI/4-BDAF Modifications

A series of PETI-4-BDAF imide oligomers as shown below with molecular weights 2K, 3K and 5K were prepared and evaluated.

and 3K series made unacceptable coatings for fiber applications at this molecular weight level.

6) 3 FDA Backbone Modified PETI-5 (Bulky Group)

It was theorized that introduction of dianhydride with bulky groups to replace the linear dianhydride (BPDA) in PETI-5 would decrease the melt viscosity of the imide oligomer due to decreased intramolecular interactions. The dianhydride monomer, 4,4'-(2,2,2-trifluoro-1-pentafluorophenylethylidene) diphthalic dianhydride (3FDA) was substituted for 3,3',4,4'-biphenylene dianhydride (BPDA) A series of phenylethynyl end-capped 3FDA/diamine imide oligomers as shown immediately below were synthesized and tested for their ability to melt coat on an optical fiber.

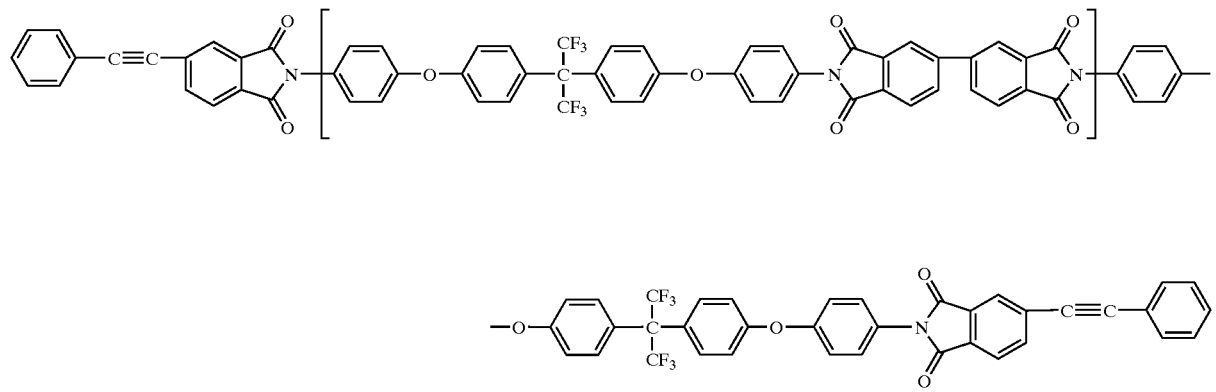

PETI/4-BDAF Imide Oligomers

The synthesis was carried out using the conventional procedures as described for PETI-5 and other imide oligomers and which have been disclosed herein. Thermal analysis data of the PETI-4-BDAF series are shown in Table 5.

TABLE 5

Thermal Analysis Data for PETI4-BDAF Materials

| | PRIOR TO CURE | | | | |
|---|---|---|---|---|---|
| | $T_g$ | Melting Temp. | Onset of cure reaction | Peak of cure reaction | POST CURE $T_g$ |
| PETI-4-BDAF 2000 | 171.2 | 210.9 | 357.3 | 394.7 | 301.2 |
| PETI-4-BDAF 3000 | 184.1 | 239.2 | 379.1 | 414.2 | 278.0 |

The 2000 and 3000 MW oligomers of PETI-4-BDAF were subjected to fiber coating evaluations by coating on optical fibers at 100% concentration with no diluents, using the dip method and a hot plate to melt the resin. When coated onto the fiber, the uncured PETI-BDAF, regardless of molecular weight, beaded upon cooling. The beading also created a series of crack lines throughout the length of the recoated fiber as shown in FIG. 1. The PETI-4-BDAF 2K

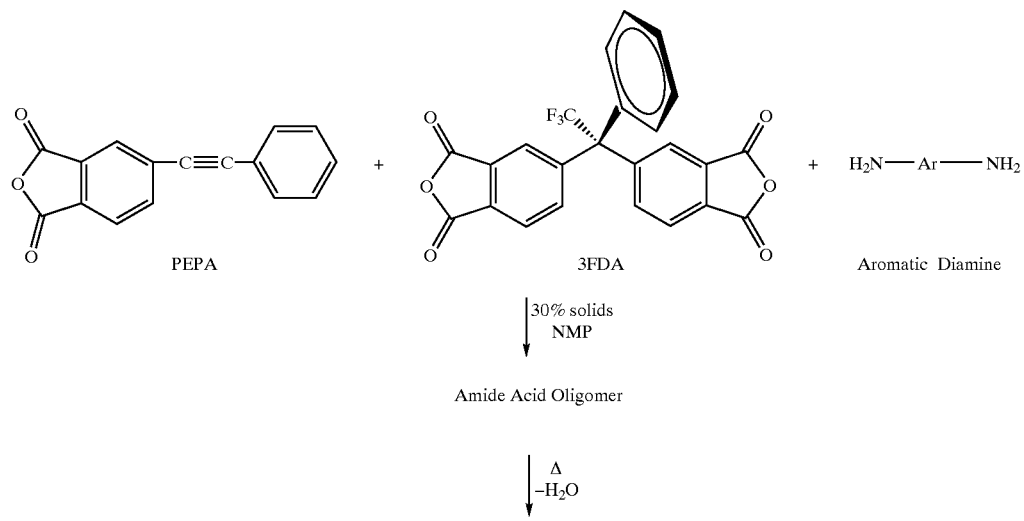

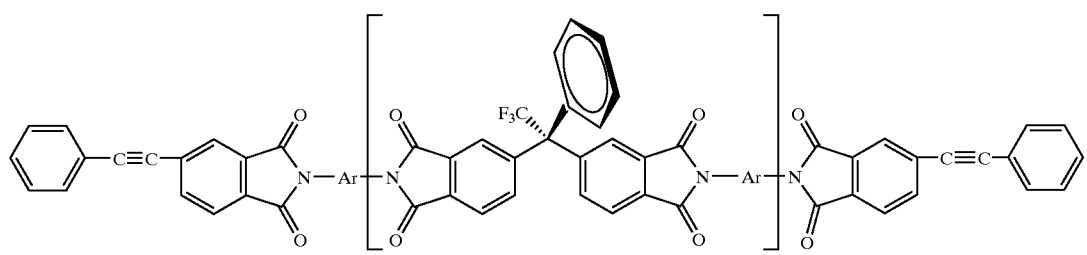

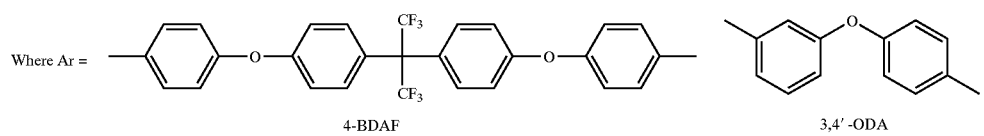

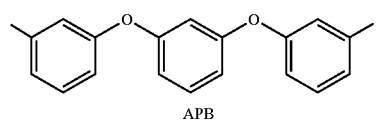

3FDA Polymers Synthesized

These materials were synthesized in the manner described for PETI-5. Thermal analysis data are listed in Table 6.

The polymer wherein there are present two phenyl groups was also synthesized by using the appropriate starting material. The polymers met the temperature criteria for use as coating materials.

In the structures illustrated herein and corresponding to the high viscosity and low melt processable imides of the invention, n=1–100 and MW=500–20,000.

TABLE 6

Thermal Analysis of PE-3FDA-PETI-5 Imide Oligomers

| Material | Uncured $T_g$ ° C. | Melt Temp. ° C. | Cured $T_g$ ° C. |
| --- | --- | --- | --- |
| PE 3FDA-PETI-3K | 182 | None | 285 |
| PE 3FDA-PETI-5K | 218 | None | 272 |
| PE 3FDA-APB-5K | 178 | None | 222 |
| PE 3FDA-3,4'-ODA 5K | 226 | None | 288 |
| PE 3FDA-4-BDAF-3K | 184 | None | 278 |
| PE 3FDA-4-BDAF-5K | 237 | None | 279 |

The glass transition temperature and molecular weights as determined by gel permeation chromatography (GPC) are summarized in Table 7. The melt viscosities of these 3FDA imide oligomers were also determined and are listed in Table 8 along with their cured glass transition temperatures, $T_g$. A material having a glass transition temperature below about 275° C. was excluded from further consideration as it does not meet the temperature criteria for a coating material.

TABLE 7

Glass transitions temperatures and GPC molecular weights of oligomers evaluated

| OLIGOMER | $T_g$ (° C.) Before Cure | $T_g$ (° C.) After Cure | GPC Mol. Weight $M_n$ | GPC Mol. Weight $M_w$ | PDI |
| --- | --- | --- | --- | --- | --- |
| PETI-3 | 185 | 262 | | | |
| PETI-5 | 226 | 275 | | | |
| PETI-2/PEPA-BDAF 70:30 Blend | 160 | 298 | | | |
| PETI-BDAF 2K | 171 | 301 | | | |
| PETI-BDAF 3K | 184 | 278 | | | |
| PE-3FDA-APB 5K | 178 | 222 | 5,406 | 11,055 | 2.10 |
| PE-3FDA-3,4'-ODA 5K | 226 | 288 | 5,207 | 10,830 | 2.08 |
| PE-3FDA-BDAF 3K | 184 | 278 | | | |
| PE-3FDA-BDAF 5K | 237 | 279 | 5,833 | 12,696 | 2.17 |
| PE-3FDA-PETI-3 | 182 | 285 | | | |
| PE-3FDA PETI 5 | 218 | 272 | 5,032 | 11,759 | 2.33 |

Figure 2:
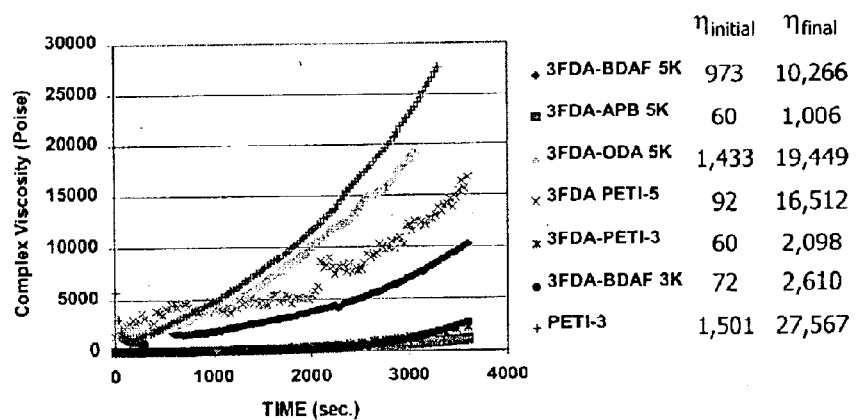
FIG. 2 is a graph of the isothermal viscosities of the PETI oligomers at 310° C.
Figure 3:
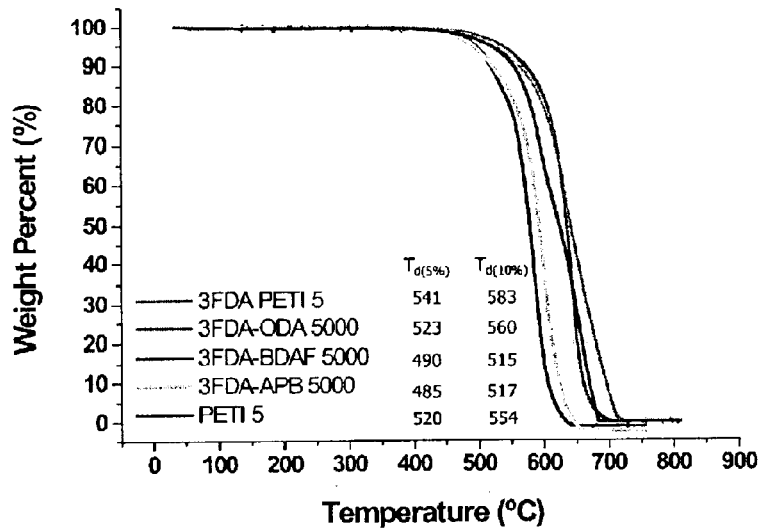
FIG. 3 is a graph of the thermal stabilities of 3F oligomers as thereon identified.

The melt stability of these materials were determined at 310° C., and shown in the synthesis scheme illustrated above for 3FDA polymers and in Table 8 (infra). The low melt viscosities of all of the systems studied, particularly, 3FDA-BDAF-3K, 3FDA-PETI-3, 3FDA-APB-5K, clearly show the effect the bulky groups in 3FDA have in reducing viscosity relative to PETI-3 or PETI-5, which contains the planar biphenylenedianhydride repeat unit. The system 3FDA-APB-5K can be eliminated due to its low $T_g$ after cure All of the other 3FDA materials have acceptable $T_g$'s for this application. The thermal stabilities of these PE-3FDA resin materials as measured by thermogravimetric analysis (TGA) are shown in FIG. 2, and the relationship of the melt viscosity at 310° C. to the cured $T_g$ is shown in Table 8. These novel materials are equivalent in thermal and thermooxidative stabilities to the PETI-5 resin material.

Figure 4:
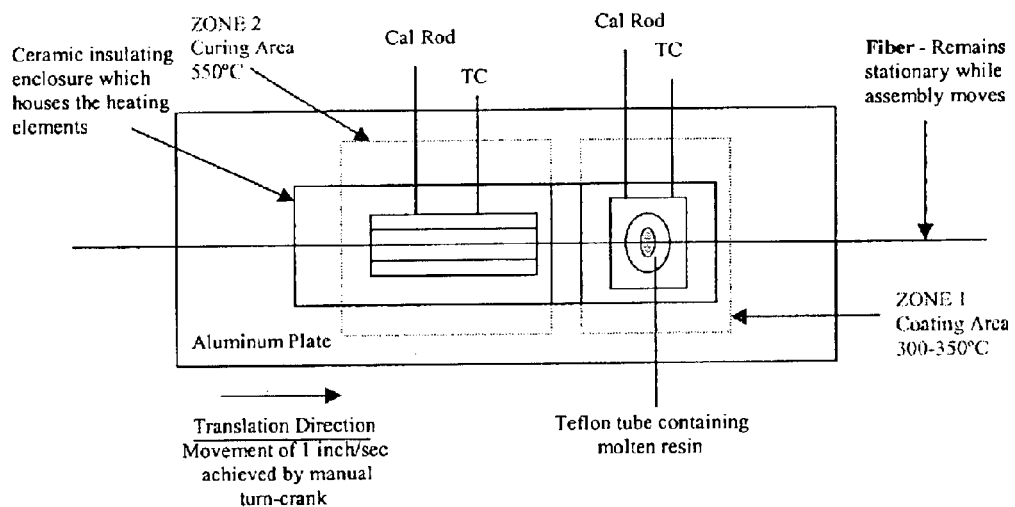
FIG. 4 is a schematic representation of an optical fiber coater and cure oven.
Figure 5:
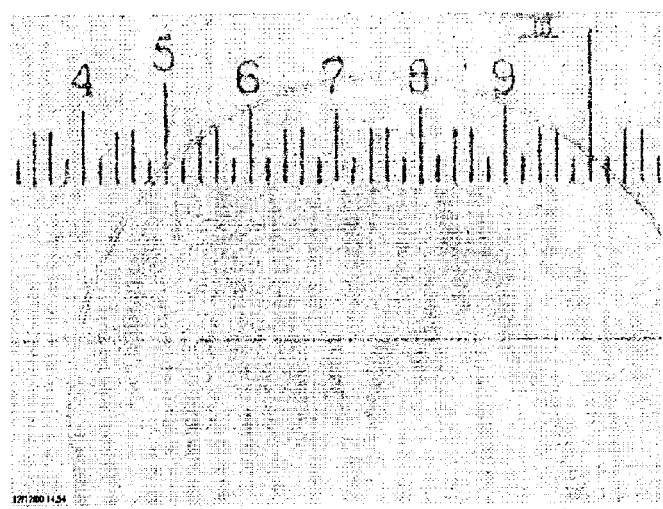
FIG. 5 illustrates a 3FDA-PETI-5 coated and cured fiber drawn into a ¾" diameter closed loop without damage to the fiber on coating.

In addition to thermal stability and glass transition temperature, $T_g$, tensile strength, and strain-to-failure are important properties for a buffer coating intended for use in an oil well drilling application. The tensile properties are shown in Table 9. These materials were evaluated for their coating ability in equipment designed to melt coat and cure the coating immediately after it emerges from the coater (FIG. 4). Only one coating material, PE-3FDA-BDAF-5K produced a smooth, coherent coating, free of voids, cracks, or beaded areas. A strain-to-failure of at least 5% is required of the coating for use on an optical fiber. All the materials tested met with these criteria, and have adequate strength, stiffness, and toughness characteristics required for this application. When an optical fiber coated with PE-3FDA-BDAF is bent into a ¾ inch diameter closed loop (FIG. 5), it does not undergo cracking or failure. This is one of the requirements of a coated optical fiber. In the laboratory coating studies using the coater depicted in FIG. 4, complete cure was attained in 3 seconds residence time at a temperature about 475° C. The cure of this material was determined by infrared spectroscopy.

Figure 6:
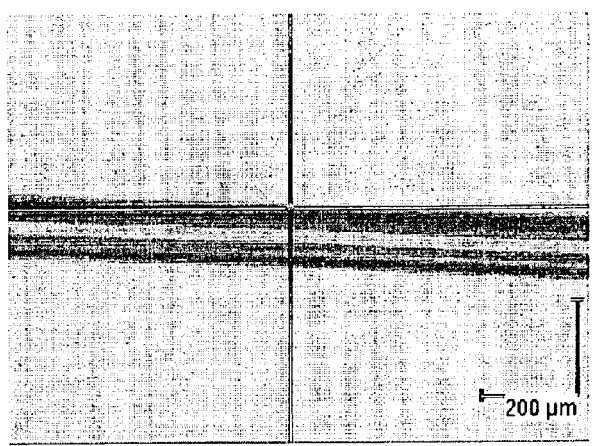
FIG. 6 is a photograph of an optical fiber coated with 3FDA-BDAF 5000.
Figure 7:
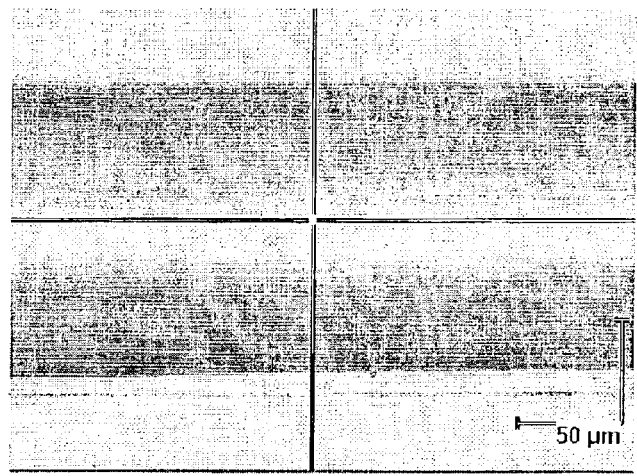
FIG. 7 is a photomicrograph of an optical fiber coated with 3FDA-PETI-5.
Figure 8:
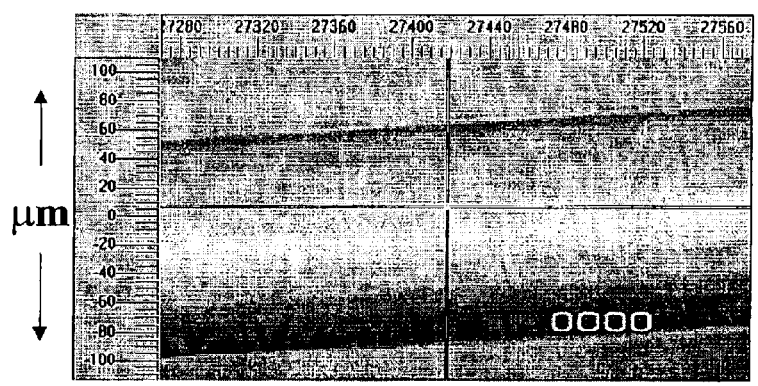
FIG. 8 is a photomicrograph of an optical fiber coated with a PETI 2 (70%)/PEPA-BD-4F (30%) blend.
Figure 9:
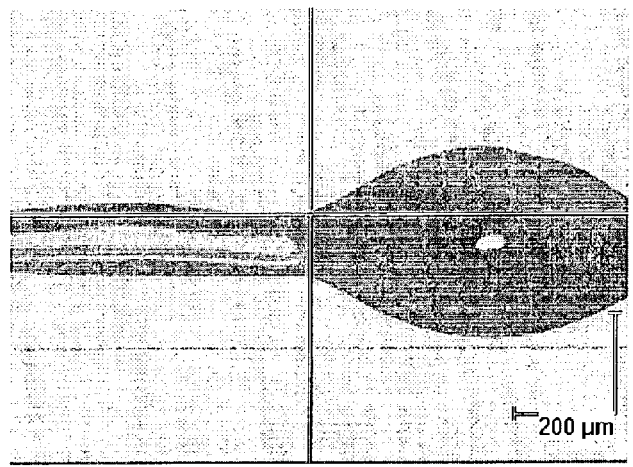
FIG. 9 is a photomicrograph of a 3FDA-A.PB 5000 coated and cured fiber showing beading.

Photomicrographs of optical fiber coated with PE 3FDA-PETI-5 and PETI-2 (70%)/PEPA-BDAF (30%) blend, and PE-3FDA-APB-5 are shown in FIGS. 6, 7 and 8 respectively. For the latter two cases, initially these were coated in the apparatus (shown in FIG. 4) without bead formation, but repeated tests showed consistent bead formation. The PE-3FDA-APD-5 resin system always produced a fiber with periodic bead formation (FIG. 9). Formation of beaded fiber is believed to be due to a fiber dewetting process. Introduction of a low surface tension additive will probably prevent the dewetting process. All of these materials appear to have use as hot melt adhesives and as resin transfer molding (RTM) materials.

TABLE 8

Phenylethynyl End-capped 3FDA Materials Selected For Coating Evaluations

| Material | Glass Transition Temp (° C.) before cure | Glass Transition Temp (° C.) after cure | Melt viscosity at 310° C. (poise) | Melt viscosity after 30 min. (poise) | Melt viscosity after 60 min. (poise) |
|---|---|---|---|---|---|
| PE-3FDA-BDAF 5K | 237 | 279 | 821 | 3269 | 10,266 |
| PE-3FDA-BDAF 3K | 184 | 278 | 72 | 147 | 2610 |
| PE-3FDA-PETI-5 | 218 | 272 | 1433 | 4620 | 16,791 |
| PE-3FDA-PETI-3 | 182 | 285 | 60 | 298 | 2098 |
| PE-3FDA-APB-5K | 178 | 222 | 53 | 207 | 978 |
| PE-3FDA-ODA-5K | 226 | 288 | 1781 | 8538 | >19,000 |
| PETI-2/PEPA-BDAF 70:30 blend | 160 | 298 | 2,260 | — | — |
| PETI-3 | 185 | 262 | 1501 | 9913 | >27,500 |
| PETI-5 | 226 | 275 | 10,000 (at 37 1'C) | — | — |

TABLE 9

Tensile Properties of Selected PE Polymer Buffer Coatings

| Material' | Strength, MPa (ksi) | Modulus, GPa (Msi) | Strain-to-failure % |
|---|---|---|---|
| PETI-2/PEPA-BDAF 70:30 blend | 1.11 | 2.12 (0.31) | 7.1 |
| PE-3FDA-BDAF-3K | 107 | 2.20 (0.32) | 6.2 |
| PE-3FDA-PETI-5K | 102 | 1.85 (0.26) | 9.0 |
| PETI-5 | 110 | 2.18 (0.31) | 10.0 |
| PETI-5 | 130 | 3.10 (0.58) | 32.0 | cured 371° C./1 hr.
cured 350° C./1 hr

The following examples are given to more fully illustrate the invention and are in nowise to be construed as a limitation thereof.

The materials which were used in carrying out the procedures as described in the Examples were prepared as hereinafter set forth or obtained from the noted sources. 4,4'-(2,2,2-trifluoro-1-phenylethylidene) diphthalic anhydride (3FDA) was prepared according to the published technique described in D. A. Scola, *J. Polym. Sci. Part A: Polym Chem.*, 31, 1997–2208 (1993). 3,4'-diaminodiphenyl ether (3,4'-ODA) was purchased from Wakagama Seika Kogyo Corp., Ltd. and used as received. 2,2-bis[4-(4-aminophenoxy)-phenyl] heaxafluoropropaene (BDAF) and 3,3',4,4'-biphenyltetracarboxylic dianhydride (BPDA) were purchased from ChrisKev Company, Inc. and used as received. 4-phenylethynylphthalic anhydride (PEPA) and 1,3-bis(3-aminophenyl)benzene (APB) were purchased from Imitec Inc. and used as received. 2,4,6-triaminopyrimidine (TAP) and 1,4 cyclohexanediamine were purchased from Aldrich and used as received. N-methyl-2-pyrolidinone (NMP), methanol, and sulfuric acid were purchased from Fisher and used without further purification.

Characterization Methods Utilized

Differential Scanning Calorimetry (DSC)

DSC of the imide oligomers was performed using a Perkin-Elmer DSC 7 Series analysis system at a heating rate of 20° C. min$^{-1}$ under nitrogen atmosphere at a flow rate of 20 cm$^3$min$^{-1}$. The glass transition temperature ($T_g$) was taken at the inflection point of the heat flow versus temperature curve.

Thermogravimetric Analysis (TGA)

TGA of cured imide film specimens was performed using a Perkin-Elmer TGA 7 Series analysis system at a heating rate of 20° C. min$^{-1}$ under nitrogen and oxygen atmosphere at a flow rate of 20 Cm$^3$ min$^{-1}$.

Gel Permeation Chromatography (GPC)

A Millipore Model 150-C GPC system was used to determine the molecular weight of the imide oligomers. NMP with 0.05 M LiBr was used as the mobile phase. The results were calibrated by standard poly(methyl methacrylate).

Infrared Spectroscopy (IR)

IR spectra of the imide oligomers were taken using a Nicolet Magna 560 FT-IR system. Spectra of cured specimens were obtained by transmission IR microscopy using a compression cell fitted with type IIa diamond windows.

Intrinsic Viscosity

Intrinsic viscosities $[\eta]^{25}{}_{NMP}$ were obtained by dissolving the imide oligomer powder in NMP at a concentration of 0.5% (w/v) and measuring the elution time using a Ubbelohde viscometer in a thermostated 25° C. water bath.

Films

NMP solutions (about 20% w/w solids) of the amide acid oligomers were filtered through a 0.45 μm supported poly (tetrafluoroethylene) filter and cast onto cleaned microscope slides. The films were dried in vacuo at 50° C. for two hours or until tack-free. The films were then cured using a muffle furnace at 100° C., 200° C., 300° C., and 371° C. for one hour at each temperature.

Complex Viscosity

Rheological measurements were conducted on a Rheometric Scientific ARES mechanical spectrometer. Sample specimen discs, 2.54 cm in diameter and about 1.5 mm thick, were prepared by press molding the imide powder at room temperature. The compacted resin disc was subsequently loaded in the rheometer fixture equipped with 2.54 cm diameter parallel plates. The lower plate was oscillated at a fixed strain of 5% and a fixed angular frequency of 10 rad s$^{-1}$ while the upper plate was attached to a transducer which recorded the resultant torque. Complex viscosity (n*) as a function of temperature was measured from 300° C. to 380° C. at a rate of 4° C. min$^{-1}$.

Tensile Properties

Unoriented thin film tensile properties were determined using a Rheometric Scientific MiniMat 2000 miniature materials tester. Sample specimens were cut using a razor blade and had the following approximate dimensions: 0.5 cm wide×6 cm long×0.05 mm thick.

EXAMPLE 1

Linear PETI Oligomers

Phenylethynyl-end-capped imide oligomers having a calculated number average molecular weight ($M_n$) of 2000, 3000, and 5000 g mol$^{-1}$ were prepared by reacting an excess of the appropriate diamine(s) with an appropriate quantity of the dianhydride in NMP at 20% (w/w) solids content. PEPA was added at the beginning of the reaction. The reaction mixture was stirred for about 20 hours at ambient temperature under a nitrogen atmosphere. A portion of the amic acid solution was used to cast unoriented thin films. Toluene was subsequently added to the remaining solution and the mixture heated to about 155° C. for about 10 hours under a nitrogen atmosphere. The water generated from the cyclodehydration of the amide acid to the imide was removed as an azeotrope using a Dean-Stark trap. The cooled reaction mixture was poured into a laboratory blender containing a 50:50 water-methanol solution to precipitate a solid that was washed successively in water and methanol and then dried at 150° C. under vacuum for 24 hours to provide the oligomers in >95% yields.

EXAMPLE 2

PETI 2000 Low Molecular Weight Linear PETI Oligomer

To a dry, three-neck, 100-mL flask equipped with Dean-Stark trap, condenser, nitrogen inlet, and magnetic stir-bar, there were added 0.5832 g (1.995 mmol) APB, 2.2636 g (11.305 mmol) 3,4'-ODA, and 10 mL NMP. The mixture was stirred at ambient temperature until the diamines were completely dissolved. 2.883 g (9.8 mmol) BPDA was then gradually added to the resulting solution as a solid over a 20-minute period. An additional 10-mL volume of NMP was added at this point. The reaction was then left to stir under nitrogen at ambient temperature for 6 hours. A solution of 1.738 g (7.0 mmol) PEPA was dissolved in a 9.8-mL volume of NMP and subsequently added to the reaction mixture resulting in a 20% (w/w) solution. The reaction was then left to continue with stirring at room temperature for 24 hours. 20 mL toluene were then added to the reaction solution and the temperature raised to provide for a steady reflux. The reaction was maintained at reflux for 12 hours, after which the flask was removed from the heat and cooled in an ice-water bath. The contents were poured into a high-speed laboratory blender containing 200 mL of a 1:1 methanol/ deionized water mixture to precipitate the oligomer. The fine powder was filtered and washed with copious amounts of deionized water and methanol. The filtered material was dried in vacuo for 20 hours at 150° C. (6.9 g, 97%). IR (KBr, cm$^{-1}$): 3073 (aryl C—H str.), 2202 (C≡C str.), 1772 (C=O asym. str.), 1723 (C=O sym. str.), 1368 (C—N str.), 733 (C=O bend).

Figure 10:
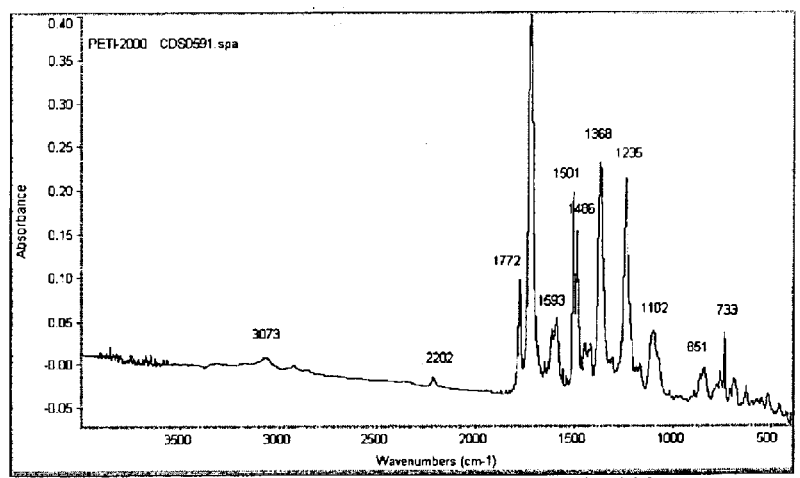
FIG. 10 shows the FT-IR spectrum of PETI-2000.
Figure 11:
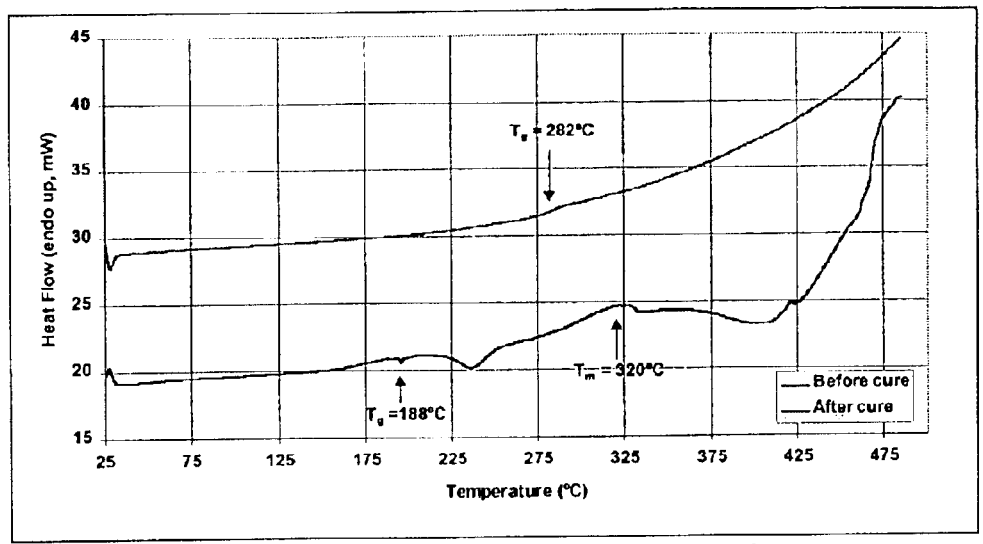
FIG. 11 shows the DSC analysis of PETI-2000.

The FT-IR spectrum and DSC thermal analysis of the PETI-2000 can be seen in FIGS. 10 and 11 respectively.

EXAMPLE 3

Figure 12:
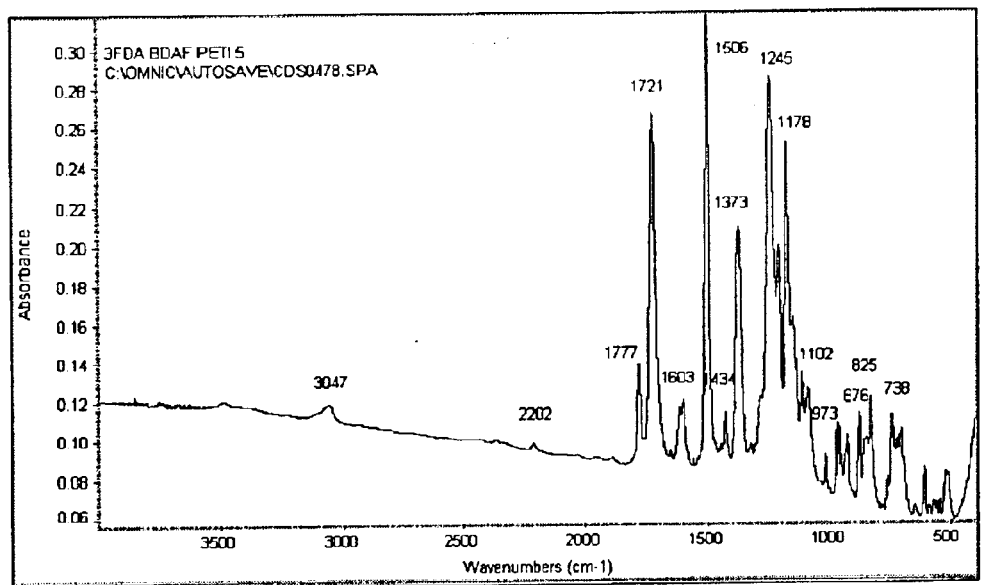
FIG. 12 shows the FT-IR spectrum of 3FDA-BDAF 5K.
Figure 13:
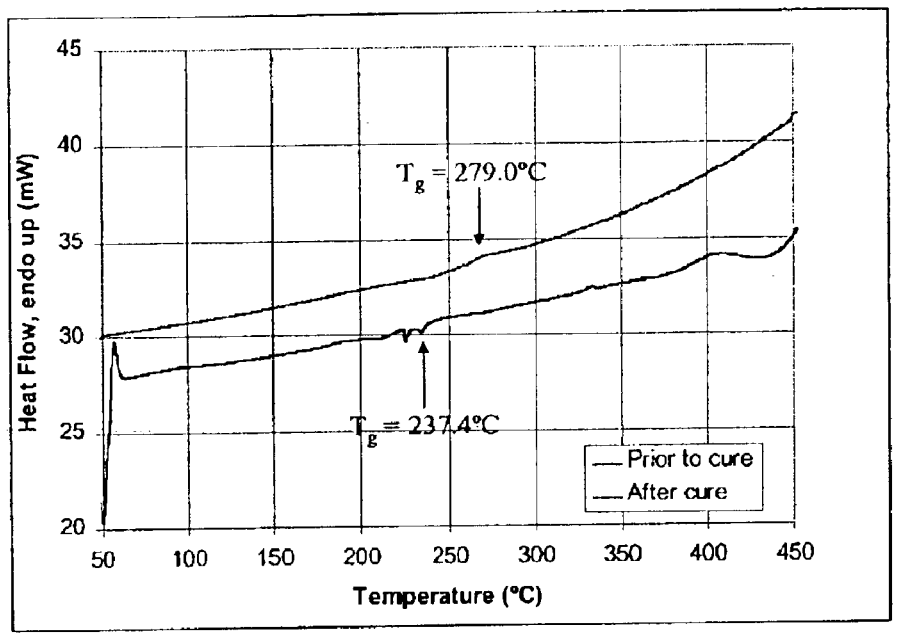
FIG. 13 shows the DSC thermal analysis of 3FDA-BDAF 5K.

PE-3FDA-BDAF 5K. Linear Oligomer with 3FDA Backbone Modification 3.848 g (7.422 mmol) BDAF and a 10-mL volume of NMP were introduced into a dried, three-neck 100-mL flask equipped with Dean-Stark trap, condenser, nitrogen inlet, and magnetic stir-bar. The mixture was stirred at ambient temperature until the diamines were completely dissolved. Then 2.724 g (6.02 mmol) 3FDA were gradually added as a solid over a 20-minute period. An additional 10-mL volume of NMP was added at this point. The reaction mixture was left to stir under nitrogen at ambient temperature for 6 hours. A solution of 0.695 g (2.8 mmol) PEPA was dissolved in 8.3 mL NMP and added to the reaction mixture resulting in a 20% (w/w) solution. The reaction was left to continue stirring at room temperature for 24 hours. Then, 20-mL of toluene was added to the reaction solution and the temperature raised to provide for a steady reflux. The reaction was maintained at reflux for 12 hours, after which the flask was removed from the heat and cooled in an ice-water bath. The contents were poured into a high-speed laboratory blender containing 200 mL of a 1:1 methanol/deionized water mixture to precipitate the oligomer. The fine powder was filtered and washed with copious amounts of deionized water and methanol. The filtered material was dried in vacuo for 20 hours at 150° C. The light beige powder obtained was recovered in 93% yield (6.5 g). IR (KBr, cm$^{-1}$): 3047 (aryl C—H str.), 2202 (C≡C str.), 1777 (C=O asym. str.), 1721 (C=O sym. str.), 1373 (C—N str.), 738 (C=O bend). The FT-IR spectrum and DSC thermal analysis of the 3FDA-BDAF-5K can be seen in FIGS. 12 and 13 respectively.

EXAMPLE 4

Figure 14:
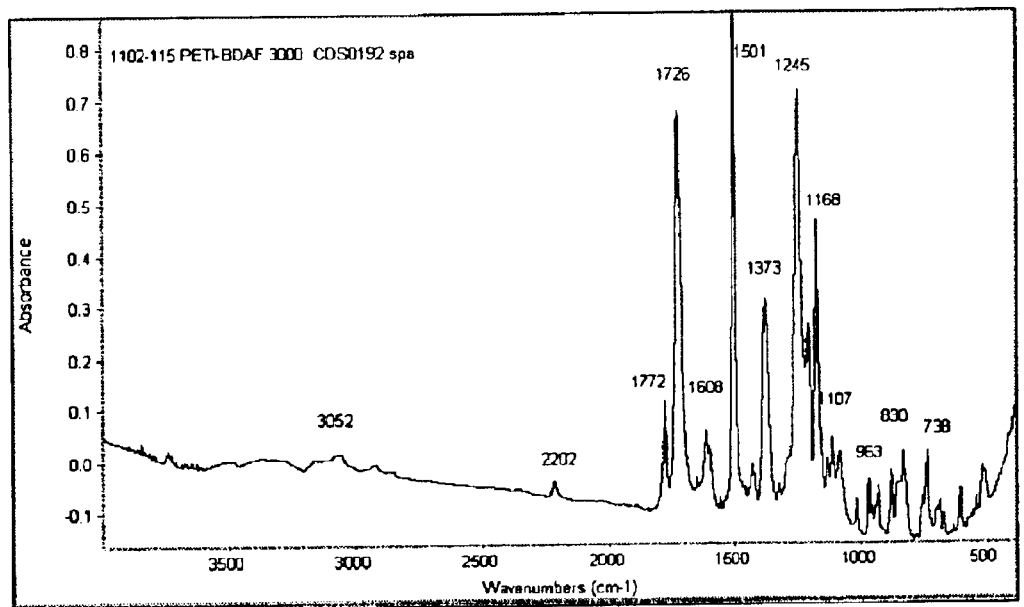
FIG. 14 shows the FT-IR spectrum of PETI-BDAF 3000.
Figure 15:
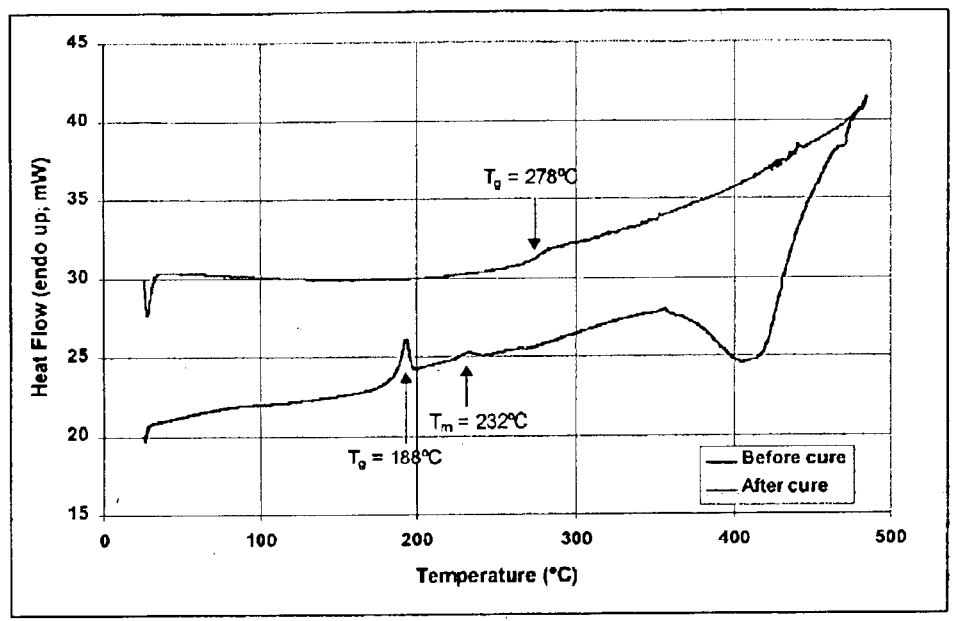
FIG. 15 shows the DSC thermal analysis of PETI-BDAF 3000.

PETI-BDAF 3000, Incorporation of Fluorinated Diamine 3.369 g (6.6 mmol) BDAF and 5 ML NMP were introduced into a dry, three-neck, 100-mL flask equipped with Dean-Stark trap, condenser, nitrogen inlet, and magnetic stir-bar. The mixture was stirred at ambient temperature until the diamine was completely dissolved. A 1.403 g (4.77 mmol) mass of 3FDA was then gradually added as a solid over a 20 minute period. An additional 5 mL volume of NMP was added at this point. The reaction was then left to stir under nitrogen at ambient temperature for 6 hours. A solution of 0.909 g (3.66 mmol) PEPA was dissolved in 3.2 mL NMP and subsequently added to the reaction mixture resulting in a 30% (w/w) solution. The reaction was then left to continue stirring at room temperature for 24 hours. A 20 mL volume of toluene was then added to the reaction solution and the temperature raised to provide for a steady reflux. The reaction was maintained at reflux for 12 hours, after which the flask was removed from the heat and cooled in an ice-water bath. The contents were poured into a high-speed laboratory blender containing 200 mL of a 1:1 methanol/ deionized water mixture to precipitate the oligomer. The fine powder was filtered and washed with copious amounts of deionized water and methanol. The filtered material was dried in vacuo for 20 hours at 150° C. The light beige powder obtained was recovered in 86% yield (4.76 g). IR (KBr, cm$^{-1}$): 3052 (aryl C—H str.), 2202 (C≡C str.), 1777 (C=O asym. str.), 1726 (C=O sym. str.), 1373 (C—N str.), 738 (C=O bend). The FT-IR spectrum and DSC thermal analysis of the PETI-BDAF are set forth in FIGS. 14 and 15 respectively.

Branched PETI Oligomers

By incorporating a small percentage of the triamine, 2,4,6-triaminopyrimidine (TAP), along with the standard diamines already described for the linear PETI oligomers, a random distribution of linear, star, and branched oligomers result, altering chain morphology.

Examples 5 and 6 detail the synthesis procedure for the MPEI-6 to functional branched oligomers and tetraphenyethyenyl terminated imide oligomer (see above).

EXAMPLE 5

Figure 16:
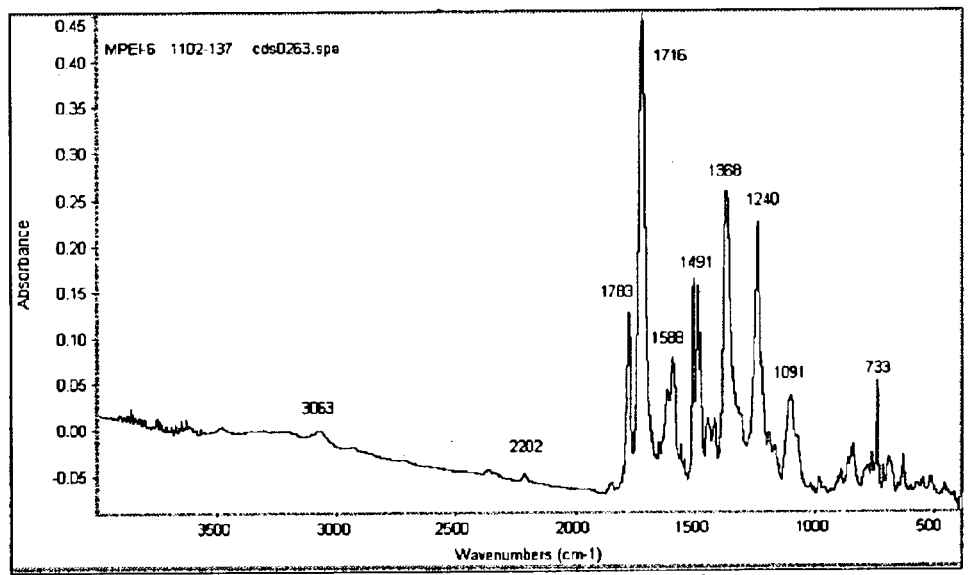
FIG. 16 shows the FT-IR spectrum of MPEI-6.
Figure 17:
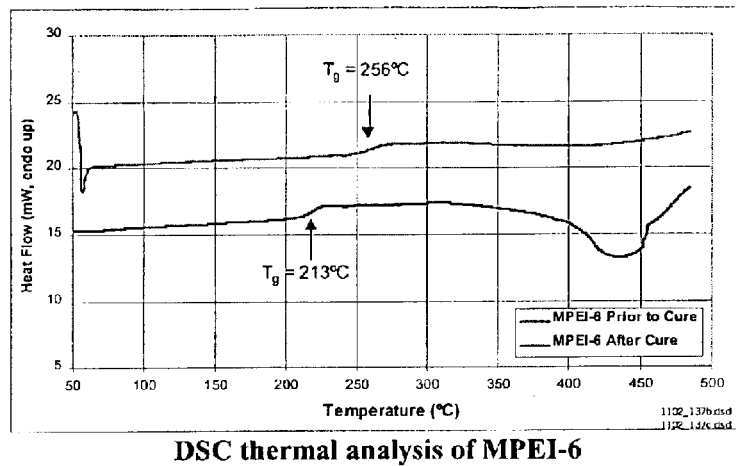
FIG. 17 shows the DSC thermal analysis of MPEI-6.

MPEI-6 Trifunctional Branched PETI Oligomer 1.149 g (3.93 mmol) of APB, 1.836 g (9.17 mmol) 3,4'-ODA, and 0.171 g (1.363 mmol) TAP were introduced into a dried 100-mL, three-neck flask equipped with a nitrogen inlet, Dean-Stark trap, condenser, and magnetic stir-bar. Next, 10 mL NMP was added to the flask and the contents stirred until dissolved. A slurry of 3.857 g (13.11 mmol) BPDA in 15 mL of NMP was then added to the reaction solution over a 40 minute period. The reaction mixture was left to stir for 6 hours at room temperature with gentle nitrogen purge after which 1.015 g (4.089 mmol) PEPA were added to the solution. The reaction solution was then continuously stirred at room temperature for 36 hours. A 20 mL volume of toluene was added to the reaction solution and the temperature raised to provide for a steady reflux. The reaction was maintained at reflux for 12 hours, after which the flask was removed from the heat and cooled in an ice-water bath. The contents were poured into a high speed laboratory blender containing 200 mL deionized water to precipitate the oligomer. The resulting fine powder was filtered and washed with copious amounts of deionized water and dried in vacuo for 20 hours at 150° C. (7.2 g, 93%). IR (KBr, cm$^{-1}$): 3063 (aryl C—H str.), 2202 (CC str.), 1783 (C=O asym. str.), 1716 (C=O sym. str.), 1368 (C—N str.), 733 (C=O bend). The FT-IR spectrum DSC thermal analysis are shown in FIGS. 16 and 17 respectively.

EXAMPLE 6

Tetra-phenylethynyl terminated imide oligomer 3000MW

Figure 18:
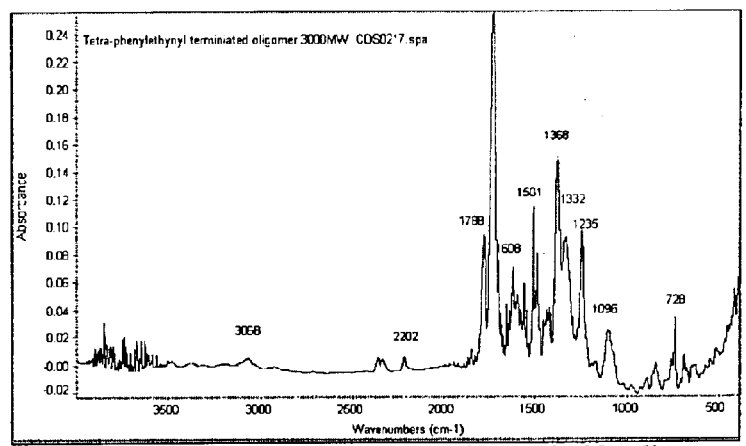
FIG. 18 shows the FT-IR spectrum of a tetra-phenylethynyl terminated inside oligomer 3000 MW.
Figure 19:
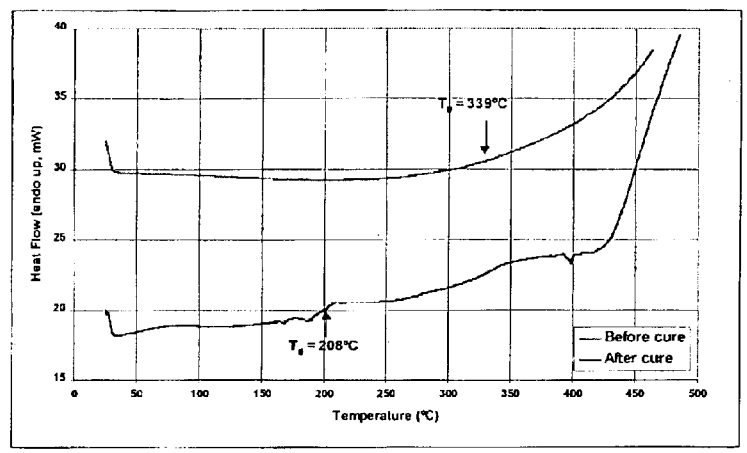
FIG. 19 shows the DSC thermal analysis of a tetra-phenylethynyl terminated imide oligomer 3000 MW.

To a dried, 100-mL, three-neck flask equipped with a nitrogen inlet, Dean-Stark trap, condenser, and magnetic stir-bar, there were added 0.2434 g (0.83 mmol) APB, 0.945 g (4.72 mmol) 3,4'-ODA, and 5 mL NMP and the contents stirred until dissolved. A slurry of 3.857 g (13.11 mmol) BPDA in 10 mL of NMP was then added to the reaction solution over a 40 minute period. The reaction mixture was left to stir for 6 hours at room temperature with gentle nitrogen purge after which 0.4179 g (3.34 mmol) TAP was added to the solution. The reaction was then left to continue stirring at room temperature for an additional 6 hours. 1.658 g (6.68 mmol) PEPA with an additional 5 mL NMP were added to the reaction solution which was left to stir for 20 hours at ambient temperature. A 20 mL volume of toluene was then added to the reaction solution and the temperature raised to provide for a steady reflux. The reaction was maintained at reflux for 12 hours, after which the flask was removed from the heat and cooled in an ice-water bath. The contents were poured into a high speed laboratory blender containing 200 mL deionized water to precipitate the oligomer. The fine powder was filtered and washed with copious amounts of deionized water and dried in vacuo for 20 hours at 150° C. The beige powder obtained was recovered in 89% yield (4.46 g). IR (KBr, cm$^{-1}$): 3068 (aryl C—H str.), 2202 (CC str.), 1788 (C—O asym. str.), 1723 (C=O sym. str.), (CC str.), 1368 (C—N str.), 728 (C=O bend). The FT-1R spectrum and DSC analysis of the tetra-phenylethynyl terminated imide oligomer are shown in FIGS. 18 and 19 respectively.

Reactive Diluents

The general procedure for the preparation of the reactive diluents involves the reaction of one mole of the appropriate diamine with two moles of PEPA. The materials are dissolved in glacial acetic acid and stirred at room temperature for three hours. An excess of acetic anhydride is then added and the reaction is heated to reflux temperature for four hours. Once completed, the reaction solution is cooled to 0° C. at which point the product slowly crystallizes out from solution. If necessary, further purification requires recrystallizing the product in glacial acetic acid.

EXAMPLE 7

PEPA-BDAF Bisimide Reactive Diluent

Figure 20:
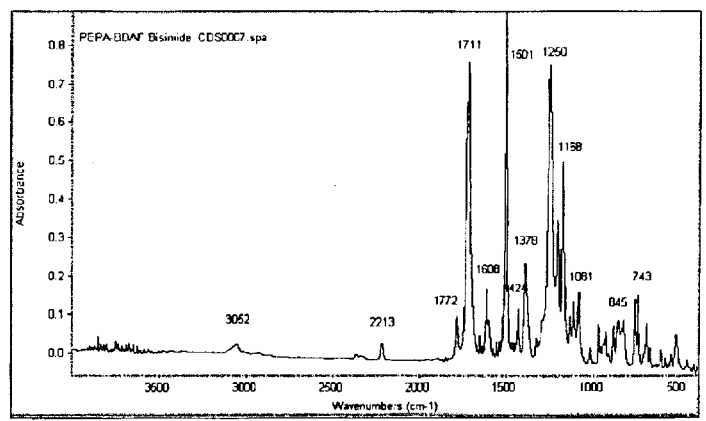
FIG. 20 shows the FT-IR spectrum of PEPA-BDAF bisimide.
Figure 21:
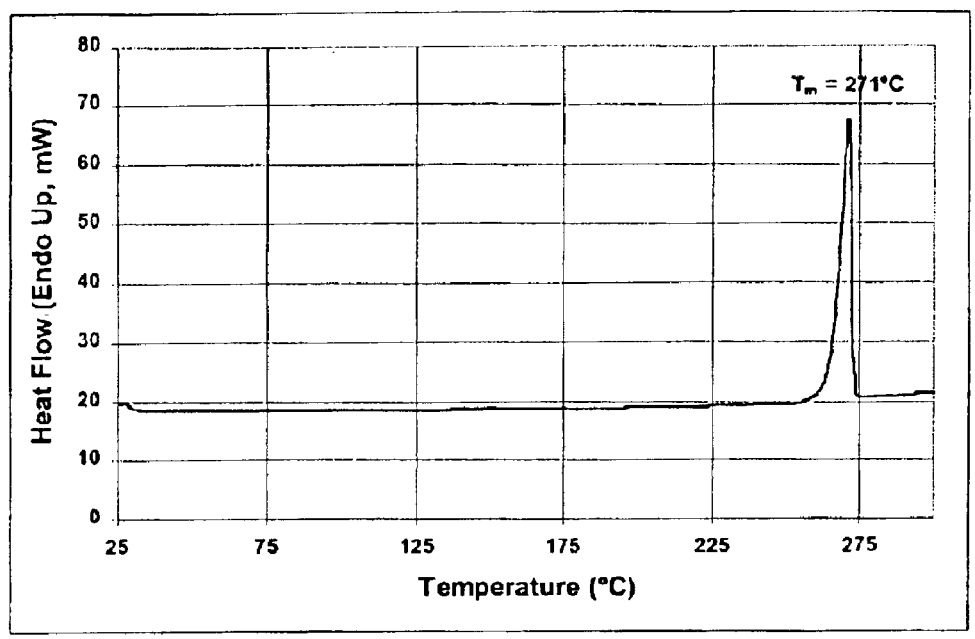
FIG. 21 shows the DSC thermal analysis of PEPA-BDAF bisimide.

To a dried, 50-mL 2-neck flask equipped with nitrogen inlet, magnetic stir-bar, and condenser, 6.126 g (12 mmol) of 4-BDAF and 5.967 g (24 mmol) PEPA were added. 15 mL of glacial acetic acid were then added to the flask and the contents were left to stir for three hours at room temperature with a gentle nitrogen purge. At this point, 25 mmol acetic anhydride were added to the reaction solution and the contents heated to reflux. After four hours of continuous refluxing conditions, the heat source was removed and the reaction solution was cooled to 0° C. The product crystallized over a 12 hour period after which the solid precipitate was filtered and washed with copious amounts of chilled (4° C.) deionized water. The solid was dried in vacuo for 20 hours at 100° C. The crude product was an off-white powder recovered in 85.3% yield (9.594 g), m.p. 255–261° C. (capillary). The product was recrystallized in glacial acetic acid and the resultant precipitate was filtered and washed with copious amounts of chilled (4° C.) deionized water. The solid was dried in vacuo for 20 hours at 100° C. The purified product was an off-white powder recovered in 80% yield, m.p. 271° C. (DSC). IR (KBr, cm$^{-1}$): 3052 (aryl C—H str.), 2213 (C≡C str.), 1772 (C=O asy. str.), 1711 (C=O sym. str.), 1378 (C—N str.), 743 (C=O bend). The FT-1R spectrum and DSC thermal analysis are set out in FIGS. 20 and 21 respectively.

EXAMPLE 8

Synthesis of PE-3FDA-PETI 5K, Linear Oligomer 4,4'-(2,2,2-trifluoro-1-phenylethylidene) diphthalic anhydride (3FDA) was prepared according to a the technique described by D. A. Scola, *J. Polym. Sci. Part A: Polym Chem.*, 31, 1997–2208 (1993). 3,4'-diaminodiphenyl ether (3,4'-ODA) was purchased from Wakagama Seika Kogyo Corp., Ltd. and used as received. 4-phenylethynylphthalic anhydride (PEPA) and 1,3-bis(3-aminophenyl)benzene (APB) were purchased from Imitec Inc. and used as received. N-methyl-2-pyrolidinone (NMP) and methanol were purchased from Fisher and used without further purification.

There were introduced into a dry three-neck 100-mL flask equipped with Dean-Stark trap, condenser, nitrogen inlet, and magnetic stir-bar, 2.007 g (10.0 mmol) 3, 4'-ODA, 0.5171 g (1.768 mmol) APB, and 7 mL NMP. The mixture was stirred at ambient temperature until the diamines were completely dissolved. 4.6592 g (10.3 mmol) 3FDA were then gradually added as a solid over a 20 minute period. An additional 10 mL volume of NMP was added at this point. The reaction was then left to stir under nitrogen at ambient temperature for 10 hours. A solution of 0.7447 g (3.0 mmol) PEPA was dissolved in 2.0 mL NMP and subsequently added to the reaction mixture resulting in a 30% (w/w) solution. The reaction was left to continue stirring at room temperature for 24 hours. A 20 mL volume of toluene was then added to the reaction solution and the temperature raised to provide for a steady reflux. The reaction was maintained at reflux for 12 hours, after which the flask was removed from the heat and cooled in an ice-water bath. The contents were poured into a high-speed laboratory blender containing 200 mL of warm methanol to precipitate the oligomer. The fine powder was filtered and washed with copious amounts of deionized water and methanol. The filtered material was dried in vacuo for 20 hours at 150° C. The light beige powder obtained was recovered in 96% yield (7.2 g). IR (KBr, cm$^{-1}$): 3047 (aryl C—H str.), 2202 (C≡C str.), 1777 (C=O asym. str.), 1721 (C=O sym. str.), 1373 (C—N str.), 738 (C=O bend).

What is claimed is:

1. A melt processable polyimide selected from the group consisting of 1) blends of a PETI oligomer with a number average molecular weight of less than 5000 g/mol with a reactive phenylethynyl end-capped diluent, 2) cyclohexane modified phenylethynyl end-capped random trifunctional imide oligomers, 3) cyclohexane modified PETI-5 linear oligomers and 4) PETI/4-BDAF imide oligomers, 3FDA and 6FDA backbone modified PETI-5.

2. A melt processable polyimide according to claim 1 wherein said reactive diluent is a phenylethynyl end-capped bismide.

3. A melt processable polyimide according to claim 1 wherein said reactive diluent is a member selected from the group consisting of 3,4'-bis[4-(phenylethynyl) phthalimide] diphenyl ether, N,N'-[2,2-(4-phenoxyphenyl) hexafluoroisopropylidene] bis-(4-phenylethynylphthalimide), N,N'-diphenylethylene) bis (4-phenylethynylphthalimide), N,N'-(1,4-phenylene) bis(4-phenylethynylphth-alimide, N,N'-(1,3-phenylene) bis(4-phenylethynyl-phthalimide, and N-[4-(3-phenoxy)-4'-phenylethynylbenzophenone]4'-phenylethynylphthalimide.

4. A melt processable polyimide according to claim 1 wherein said cyclohexane modified phenylethynyl end-capped random tri-functional imide oligomer has the following structure

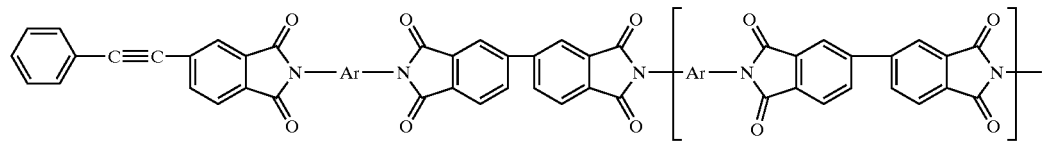

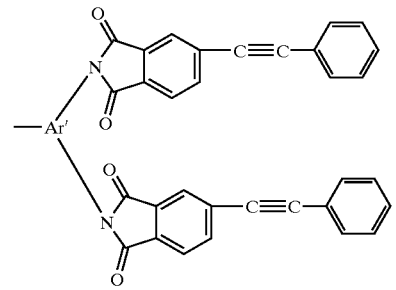

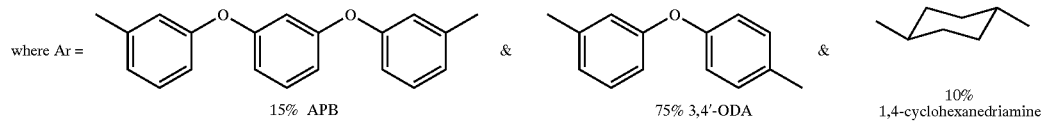

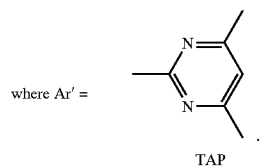

5. A melt processable imide according to claim 1 wherein said 3FDA backbone modified PETI-5 has the following structure

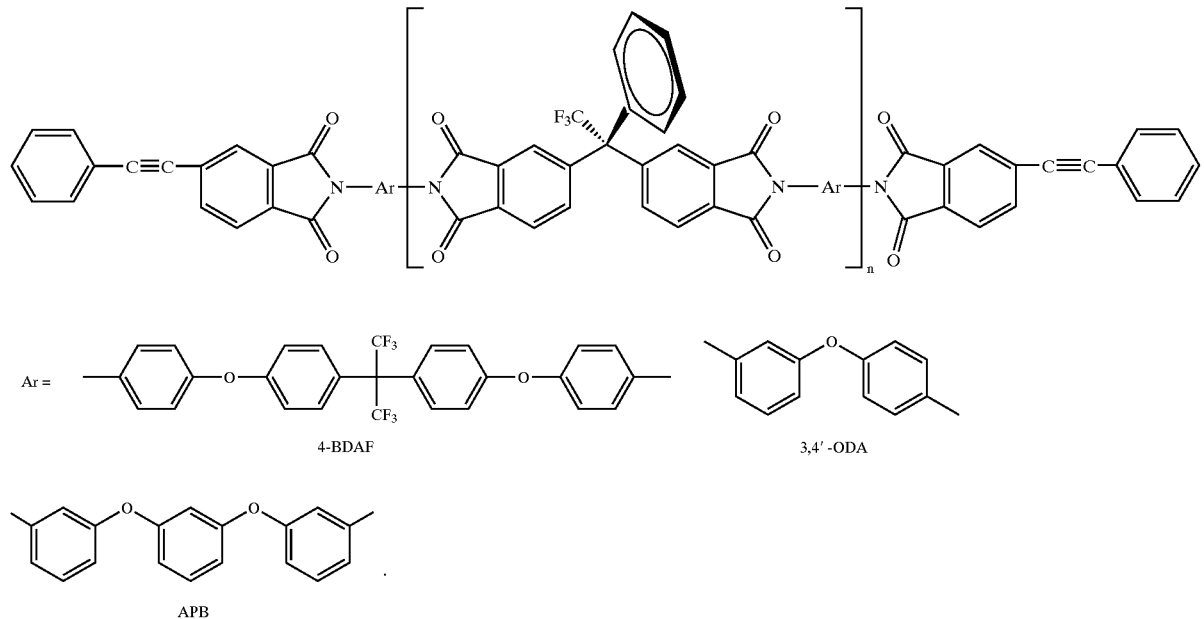

6. A melt processable imide according to claim 1 wherein said 3FDA backbone modified PETI-5 has the following structure

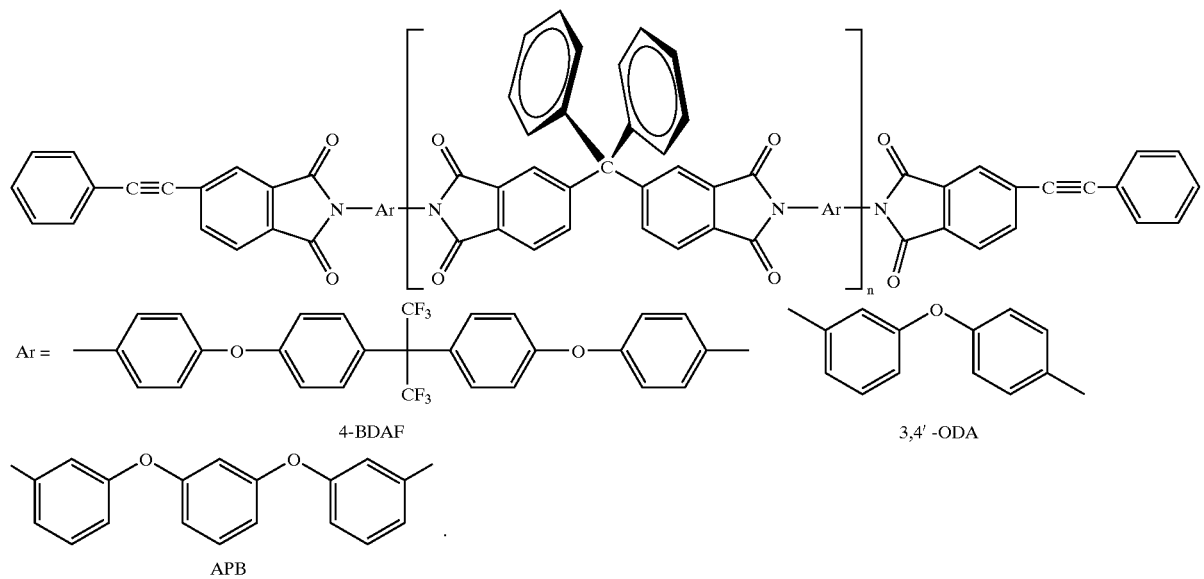

7. A melt processable imide according to claim 1 designated PE-3FDA-BDAF-5K.

8. A melt processable imide according to claim 1 designated PE-3FDA-BDAF-3K.

9. A melt processable imide according to claim 1 designated PE-3FDA-PETI-3K.

10. A melt processable imide according to claim 1 designated PE-3FDA-PETI-5K.

11. A melt coating for fiber optics comprising a melt processable polyimide according to claim 1.

12. A melt coating for fiber optics comprising a melt processable polyimide according to claim 7.

13. Process for preparing a blend of a PETI oligomer and a phenylethynyl end-capped reactive diluent comprising a) physically mixing the PETI oligomer and the phenylethynyl end-capped reactive diluent, b) heating the mixture about the melting temperature of the reactive diluent to obtain a melt, c) cooling the melt, and d) grinding the cooled melt to a fine powder.

14. Process according to claim 13 wherein said oligomer is PETI-2 and said reactive diluent is PEPA-p-PDA.

15. Process according to claim 13 wherein said oligomer is PETI-2 and said reactive diluent is PEPA-APPE.

16. Process according to claim 13 wherein said oligomer is PETI-2 and said reactive diluent is PEPA-4,4'-MDA.

17. Process according to claim 13 wherein said oligomer is and said reactive diluent is PERPA-4-BDAF.

18. Process according to claim 13 wherein said oligomer is PETI-2 and said reactive diluent is PEPA-3,4-ODA.

19. Process according to claim 13 wherein said oligomer is PETI-3 and said reactive diluent is PEPA-3,4-ODA.

20. Process according to claim 13 wherein said oligomer is PETI-5 and said reactive diluent is PEPA-3,4-ODA.

21. A process according to claim 13 wherein said reactive diluent is a reactive phenylethynyl end-capped bisimide selected from the group consisting of PEPA-3,4'-ODA, PEPA-TFMB, PEPA-4-BDAF, PEPA-4,4'-MDA, PEPA-p-PDA, PEPA-m-PDA and PEPA-APDE.

22. A process for making PETI oligomers having more than two functionalities by reacting PEPA and BPDA with a NMP solution of diamines and triamines to produce a tri-functional oligomer.

23. A process for making linear PETI oligomers modified with cyclo hexane by introducing 1,4-cyclo hexanediamine into PETI-5.

24. A process for making PETI oligomers containing fluorine by reacting PEPA with 3FDA.

25. A process according to claim 24 wherein said oligomer is PE-3FDA-BDAF.

26. A melt coat fiber optic wherein said coating is prepared from a melt processable polyimide according to claim 1.

* * * * *